Figure 1:
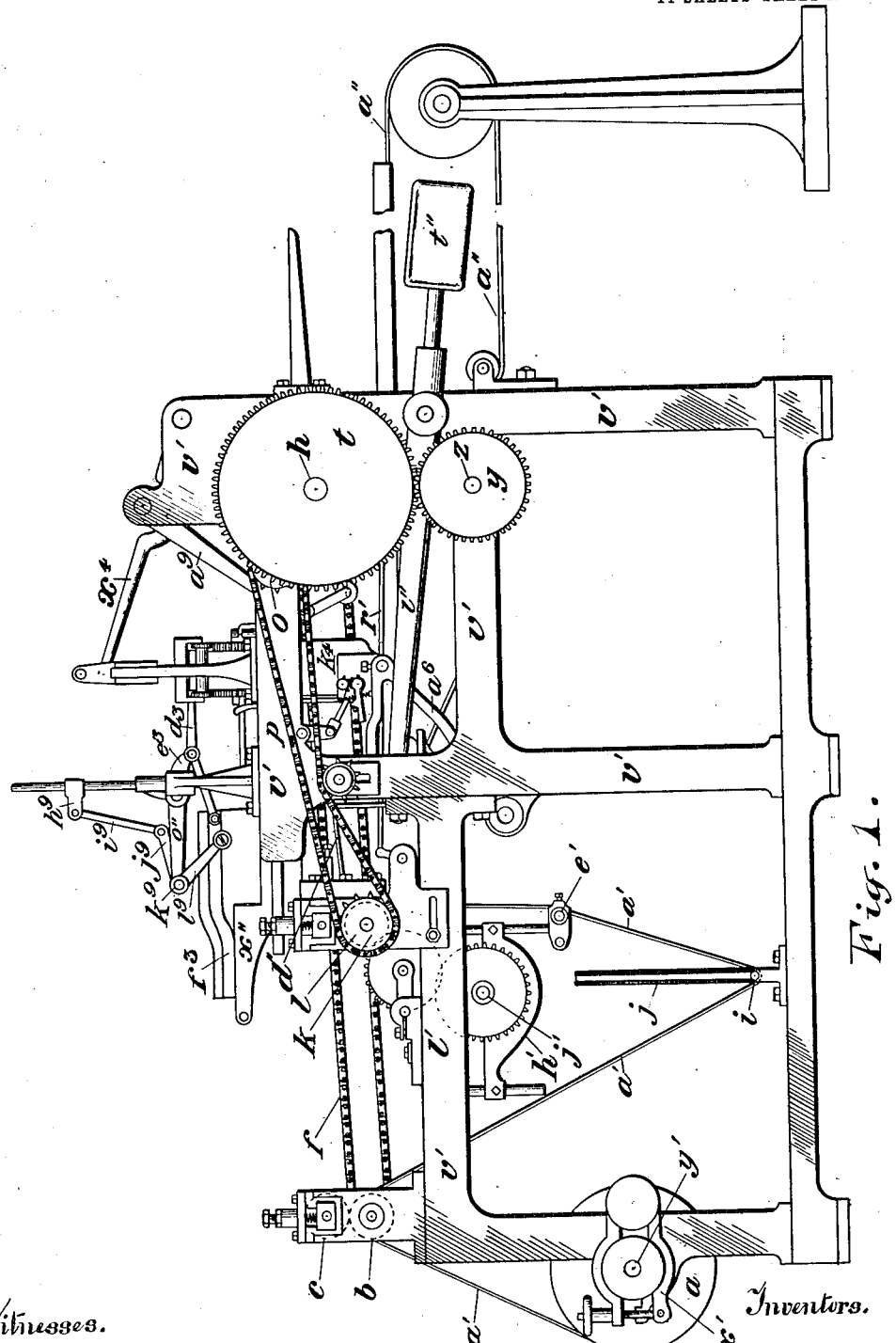

A. P. HOLDEN & P. MORGAN.
WRAPPING MACHINE.
APPLICATION FILED JULY 23, 1912. RENEWED JULY 22, 1913.

1,085,260.

Patented Jan. 27, 1914.
14 SHEETS—SHEET 1.

Witnesses.
Edward Bernstein.
Geo. K. Williams.

Inventors.
Arthur P. Holden
Philip Morgan
by Chas. A. Terry
Attorney.

A. P. HOLDEN & P. MORGAN.
WRAPPING MACHINE.
APPLICATION FILED JULY 23, 1912. RENEWED JULY 22, 1913.

1,085,260.

Patented Jan. 27, 1914.
14 SHEETS—SHEET 5.

Witnesses.
Inventors.
Arthur P. Holden
Philip Morgan
by Chas. H. Riches
Attorney A. P. HOLDEN & P. MORGAN.
WRAPPING MACHINE.
APPLICATION FILED JULY 23, 1912. RENEWED JULY 22, 1913.

1,085,260.

Patented Jan. 27, 1914.
14 SHEETS—SHEET 8.

Witnesses.

Inventors.

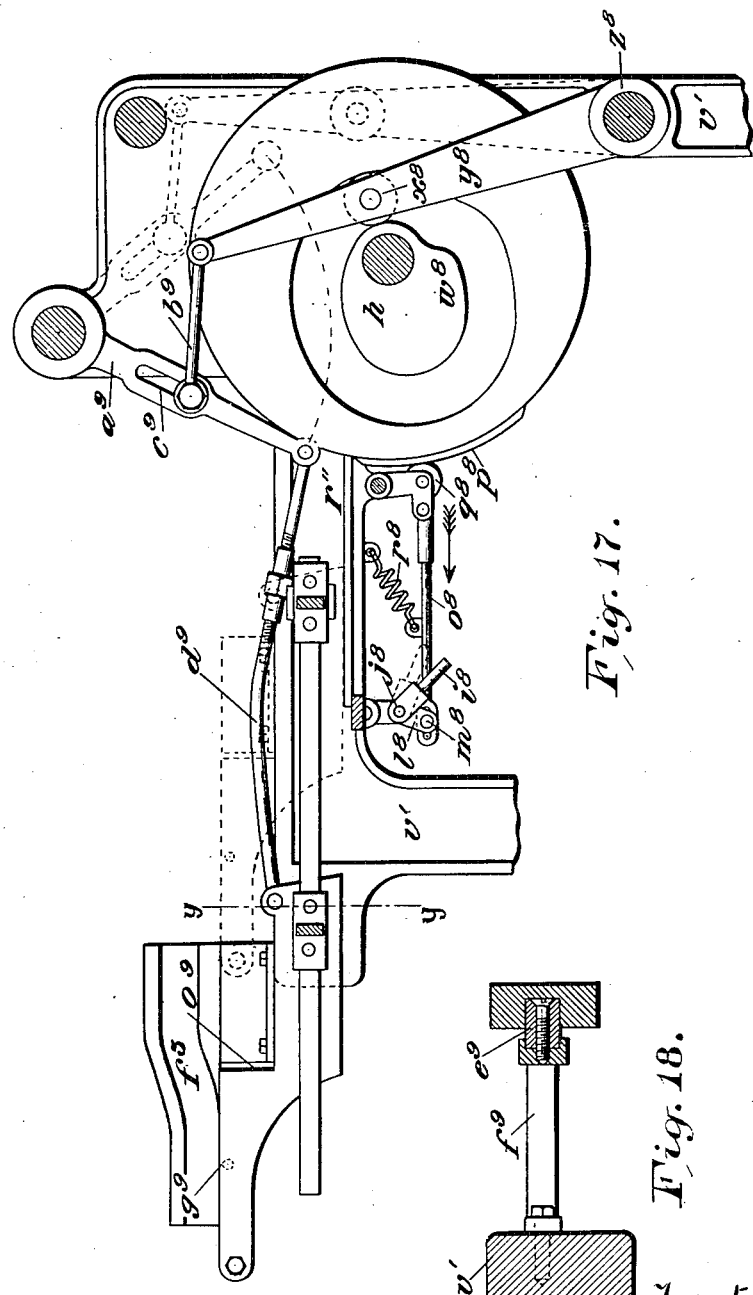

A. P. HOLDEN & P. MORGAN.
WRAPPING MACHINE.
APPLICATION FILED JULY 23, 1912. RENEWED JULY 22, 1913.

1,085,260.

Patented Jan. 27, 1914.

14 SHEETS—SHEET 14.

UNITED STATES PATENT OFFICE.

ARTHUR PEART HOLDEN AND PHILIP MORGAN, OF TORONTO, ONTARIO, CANADA, ASSIGNORS TO THE HOLDEN-MORGAN COMPANY, LIMITED, OF TORONTO, ONTARIO, CANADA, A CORPORATION OF ONTARIO.

WRAPPING-MACHINE.

1,085,260.  Specification of Letters Patent.  Patented Jan. 27, 1914.

Application filed July 23, 1912. Serial No. 711,030. Renewed July 22, 1913. Serial No. 730,572.

*To all whom it may concern:*

Be it known that we, ARTHUR PEART HOLDEN and PHILIP MORGAN, of the city of Toronto, in the county of York and Province of Ontario, Dominion of Canada, have invented certain new and useful Improvements in Wrapping-Machines; and we hereby declare that the following is a full, clear, and exact description of the same.

This invention relates to a wrapping machine in which the articles to be wrapped are successively and intermittently delivered to the feeding carriage across the path of which wrapping paper is fed from a roll and cut into wrappers of predetermined length. For example, in the case of a bread-wrapping machine the loaves, preferably conveyed by a continuous carrier from the ovens or cooling room to the bread-wrapping mechanism, are arrested near the terminus of their travel by an escapement device intermittently operating to deliver one loaf at each cycle of action to the feeding carriage which, as it moves to the folding mechanism, carries the loaf and the wrapper past the initial folders, and forms the wrapper to three sides of the loaf. These initial folders, one of which is movable across the path of the feeding carriage and the other of which is relatively stationary then draw the wrapper tightly around the loaf and spread it smoothly across the fourth side before the partly formed wrapper is engaged by the end folders, thus completing the wrapping of four sides of the loaf and preparing the wrapper for the formation of the end folds. Two lifters then operate to raise the loaf slightly above the movable initial folder so that the latter can return to its stationary position without loosening the wrapper, and then descend and allow the loaf to rest upon a table where a presser places a tension on it, and holds the wrapper in its set position, while the end folds are being formed. The end folders, which are timed to move in unison with the feeding carriage as it brings the succeeding loaf into operative relation with the initial folders, then engage the ends of the partly formed wrapper of the preceding loaf and complete the formation of the end folds. When the end folds are made, creasers come into action and crease them, and the end folds are then closed against the ends of the package to effect the sealing thereof, this creasing being necessary for the reason that highly calendered papers before being creased have sufficient spring to make the end folds spread and tear the sealing apart.

Figure 2:
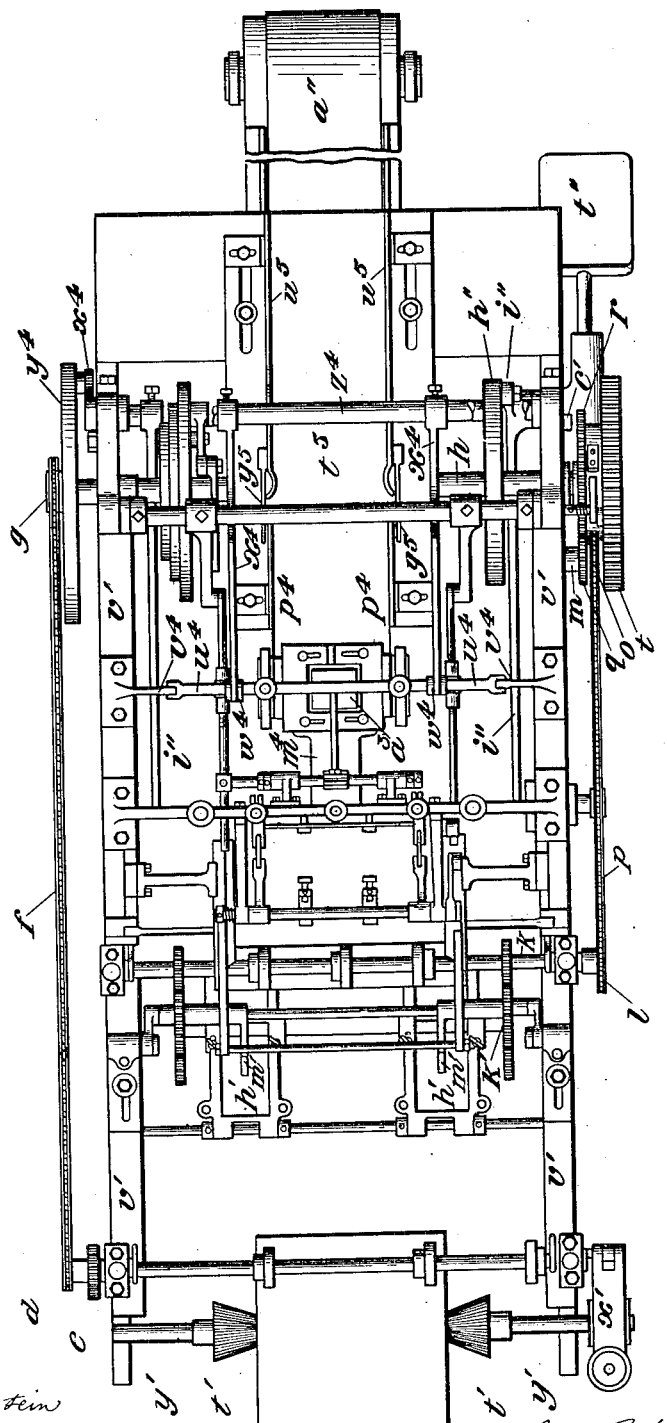
Figure 3:
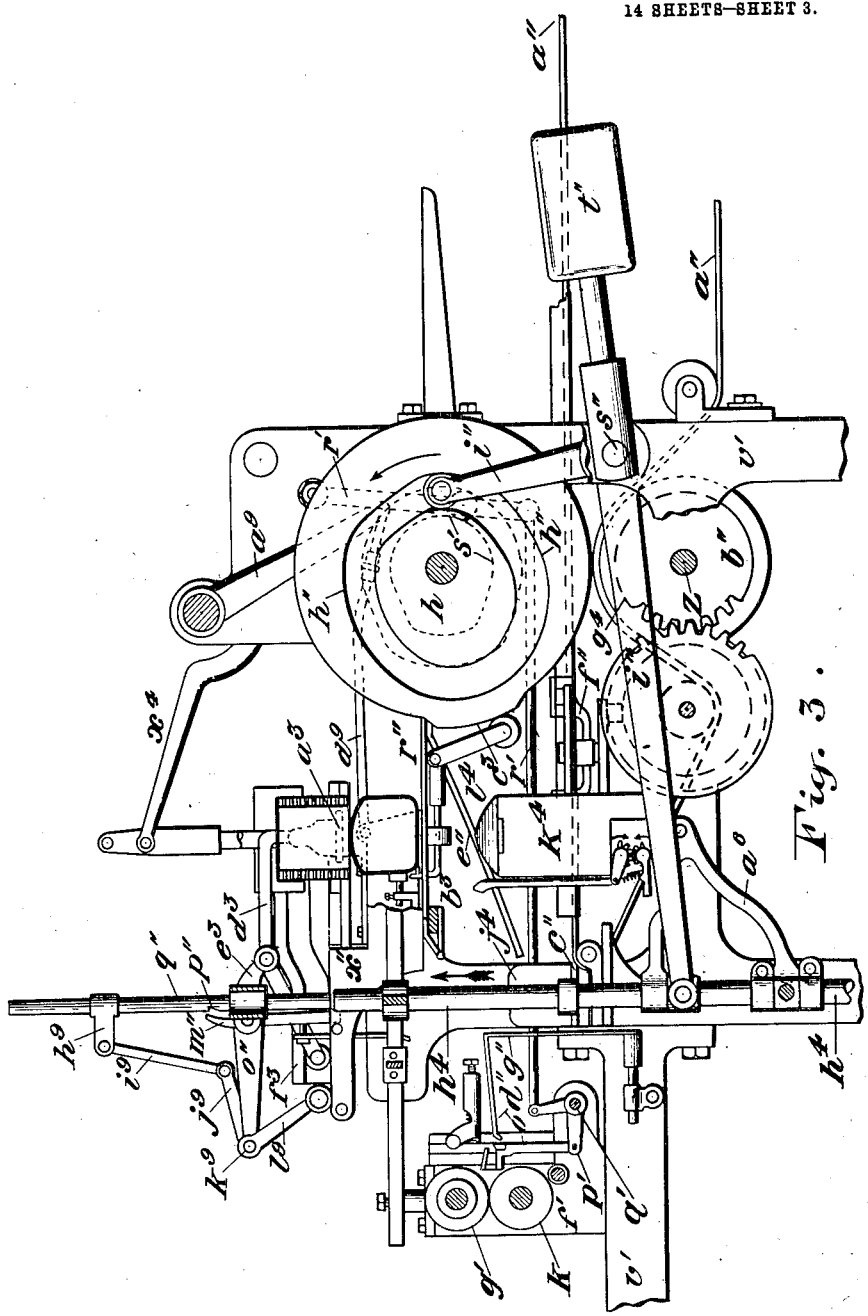
Figure 4:
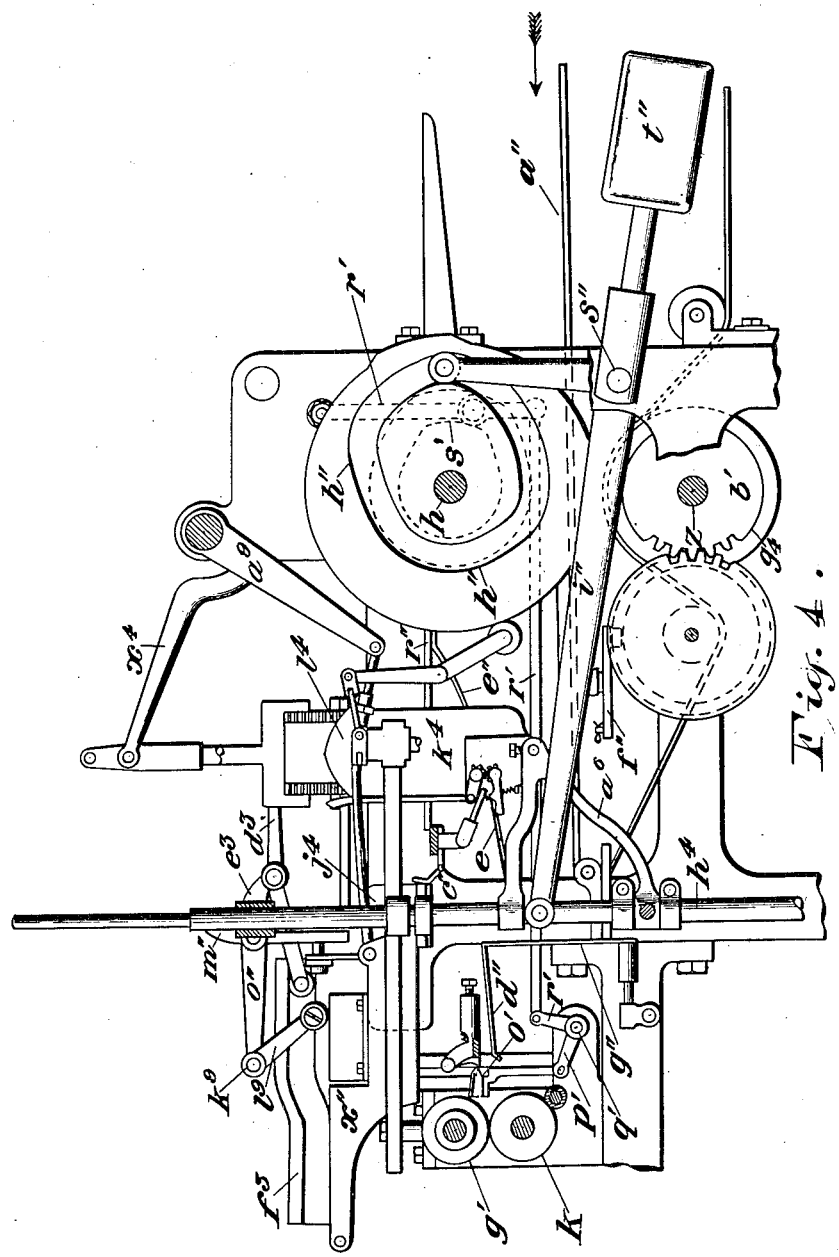
Figure 5:
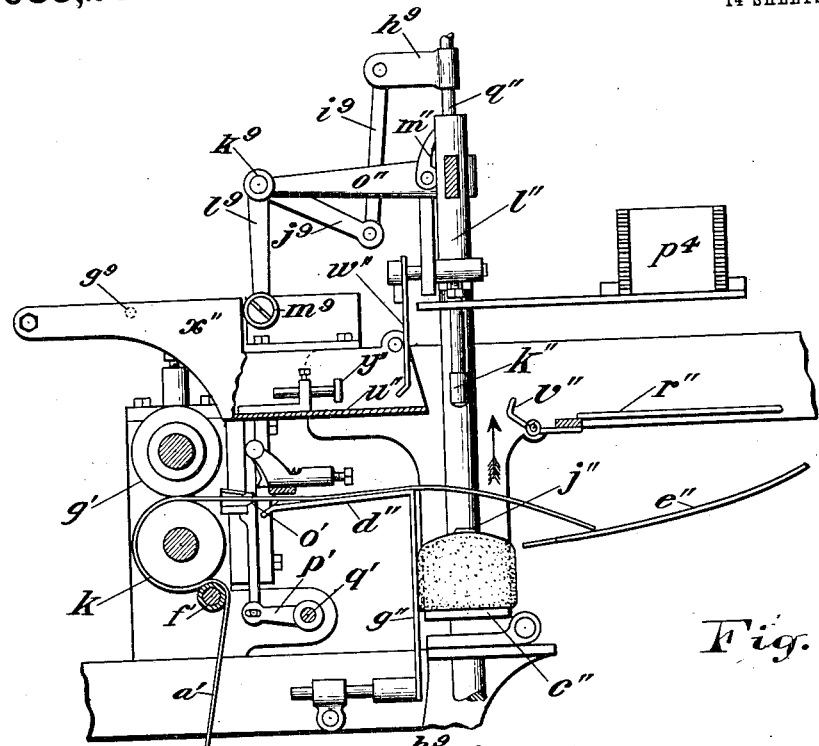
Figure 6:
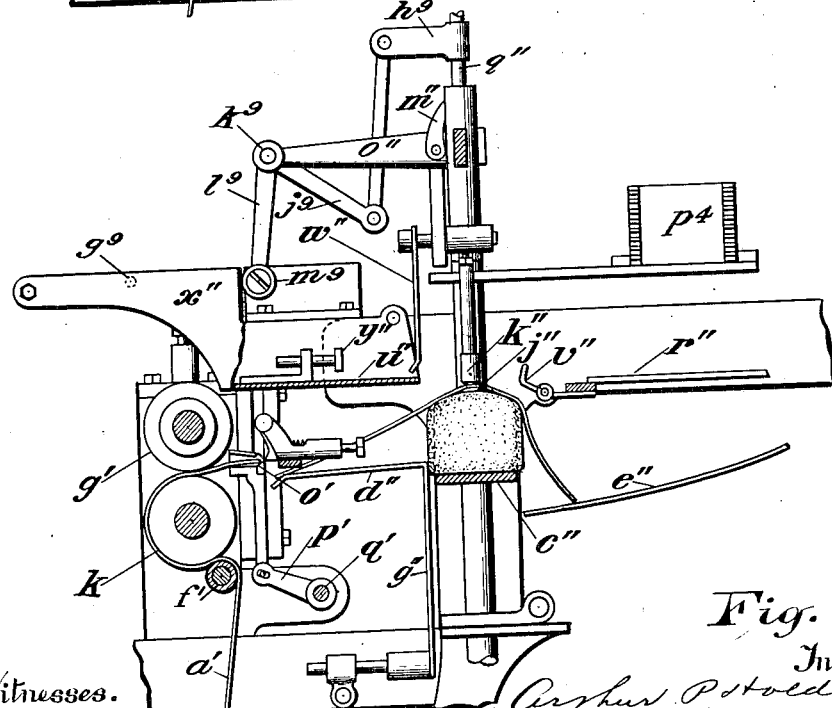
Figure 7:
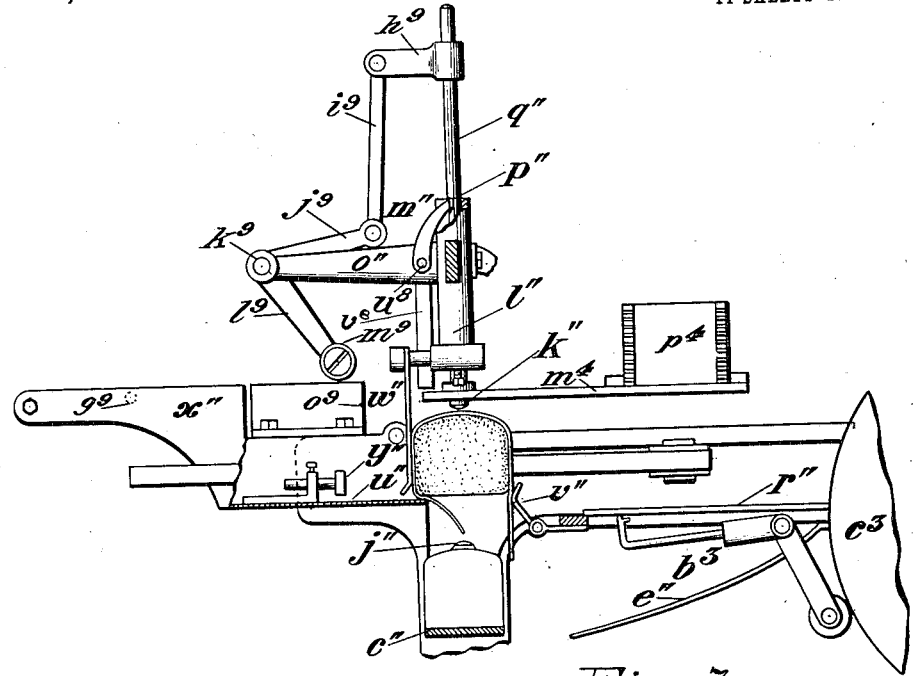
Figure 8:
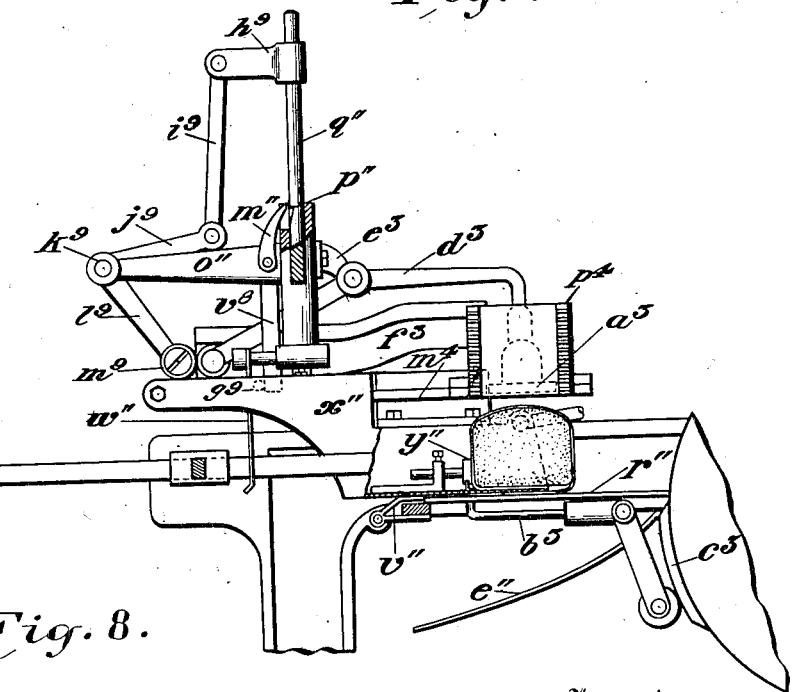
Figure 9:
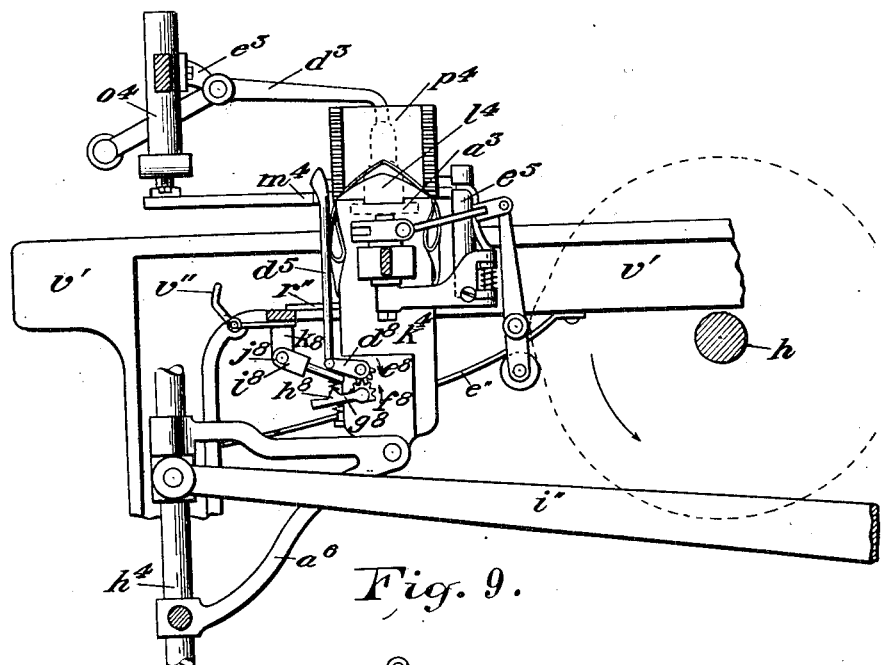
Figure 10:
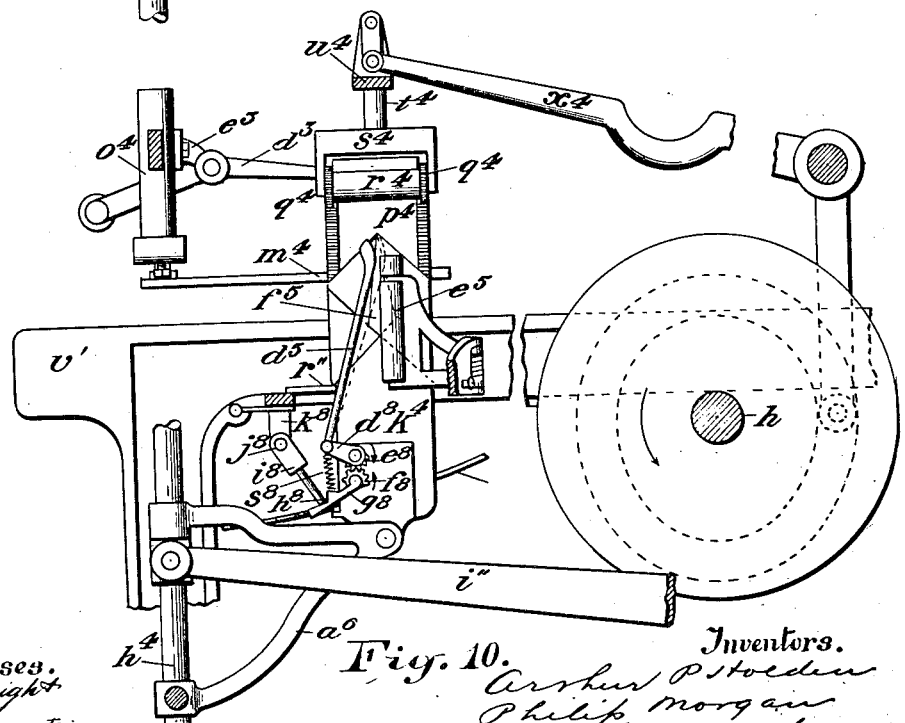
Figure 11:
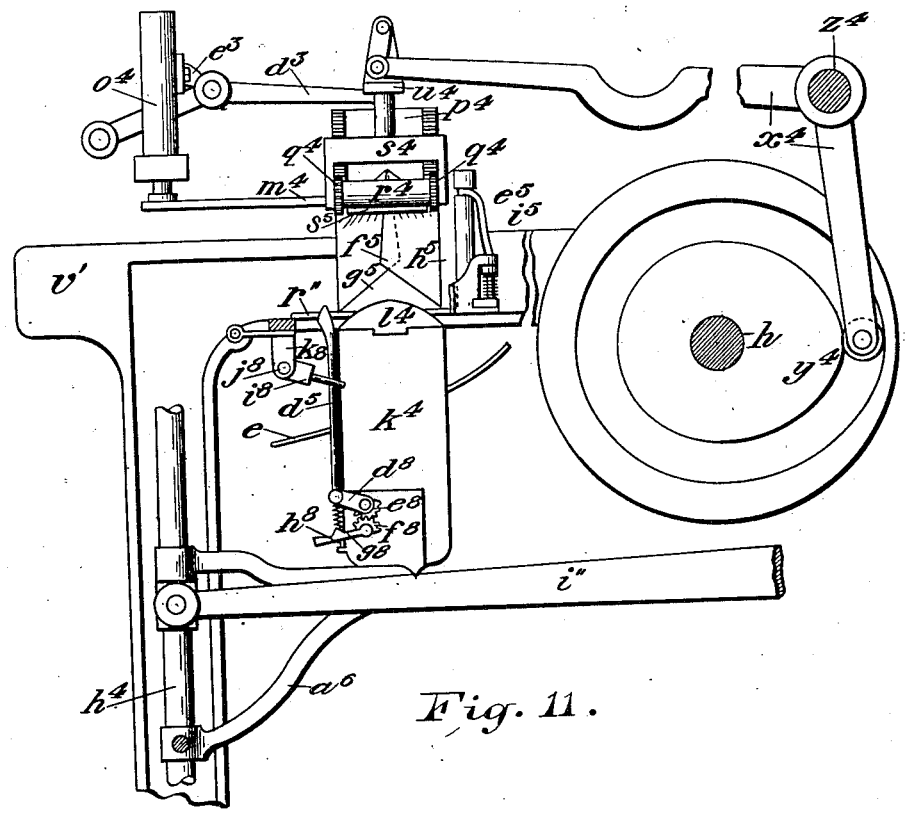
Figure 12:
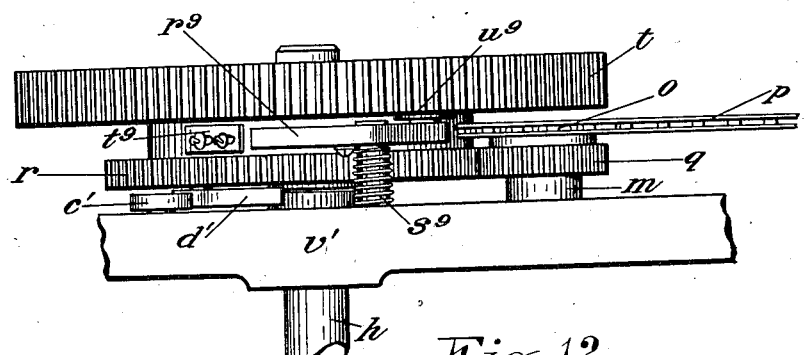
Figures 13, 14:
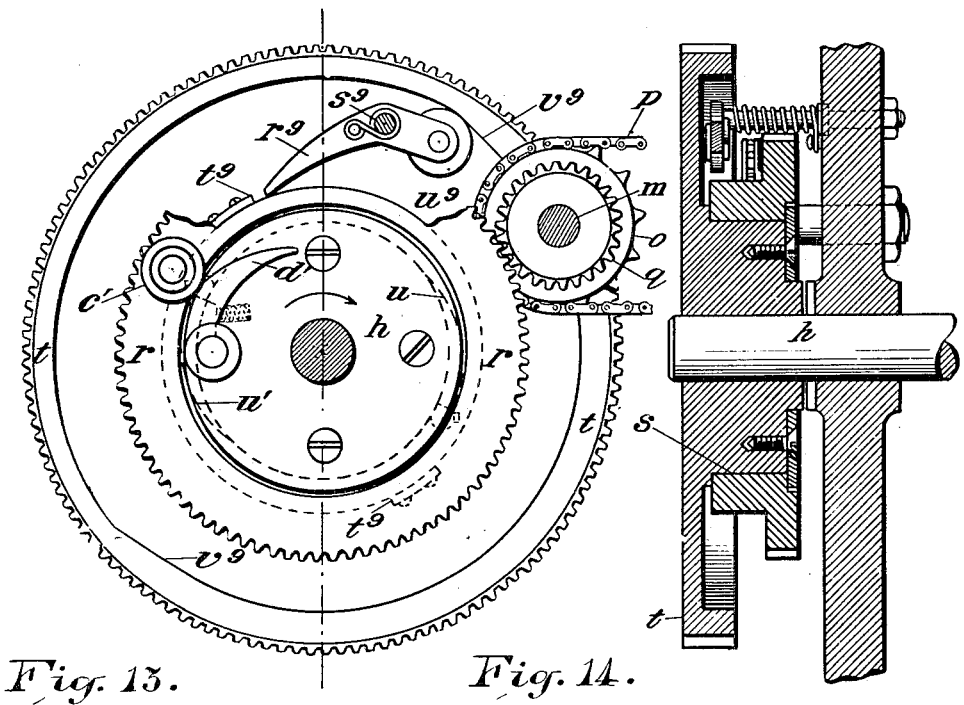
Figures 15, 16:
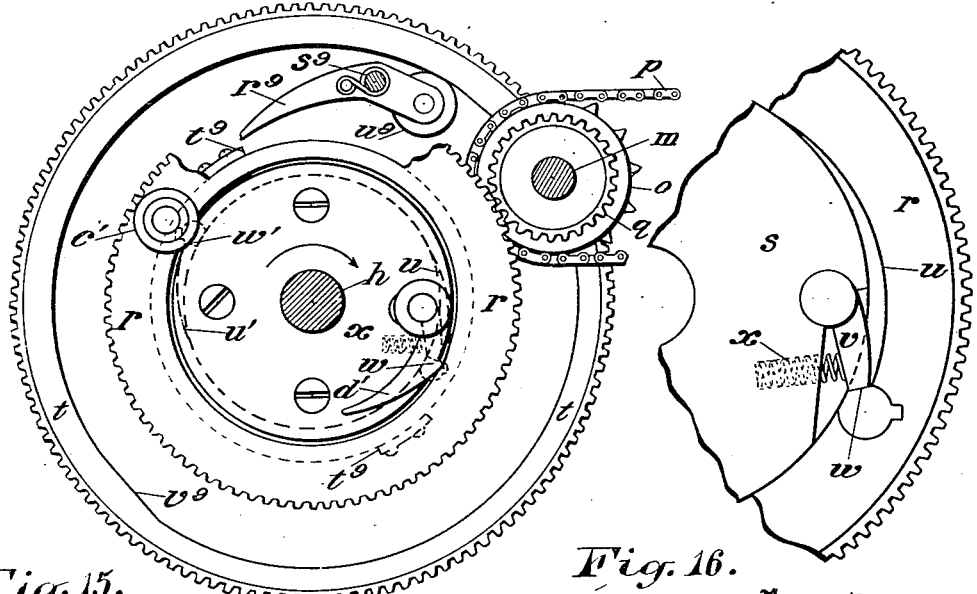
Figure 19:
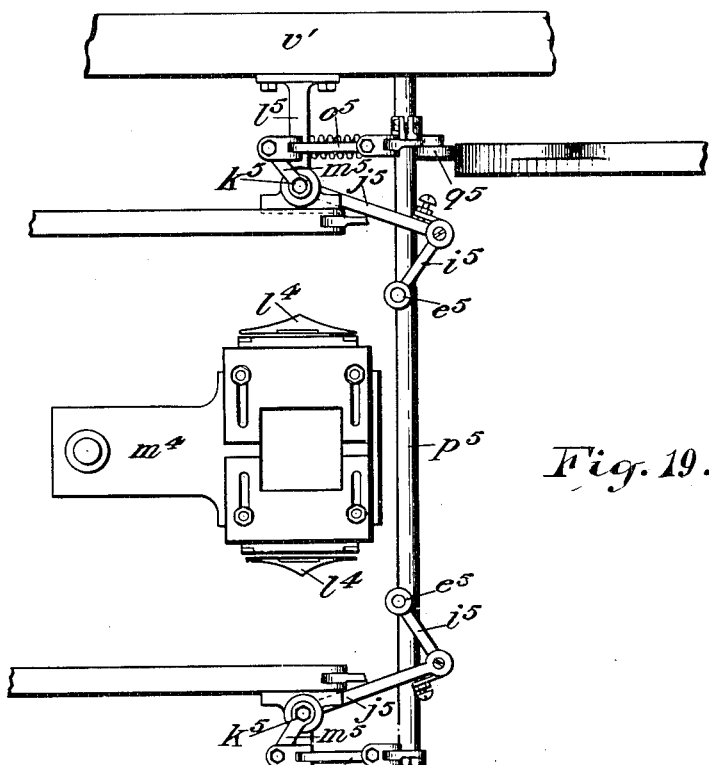
Figure 20:
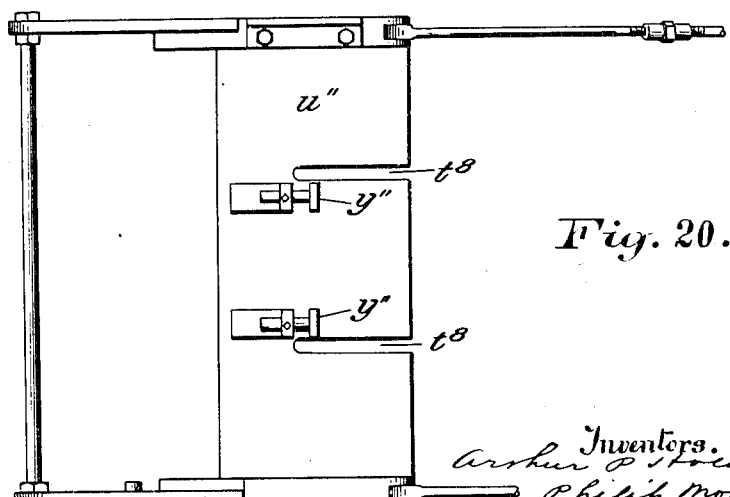
Figure 21:
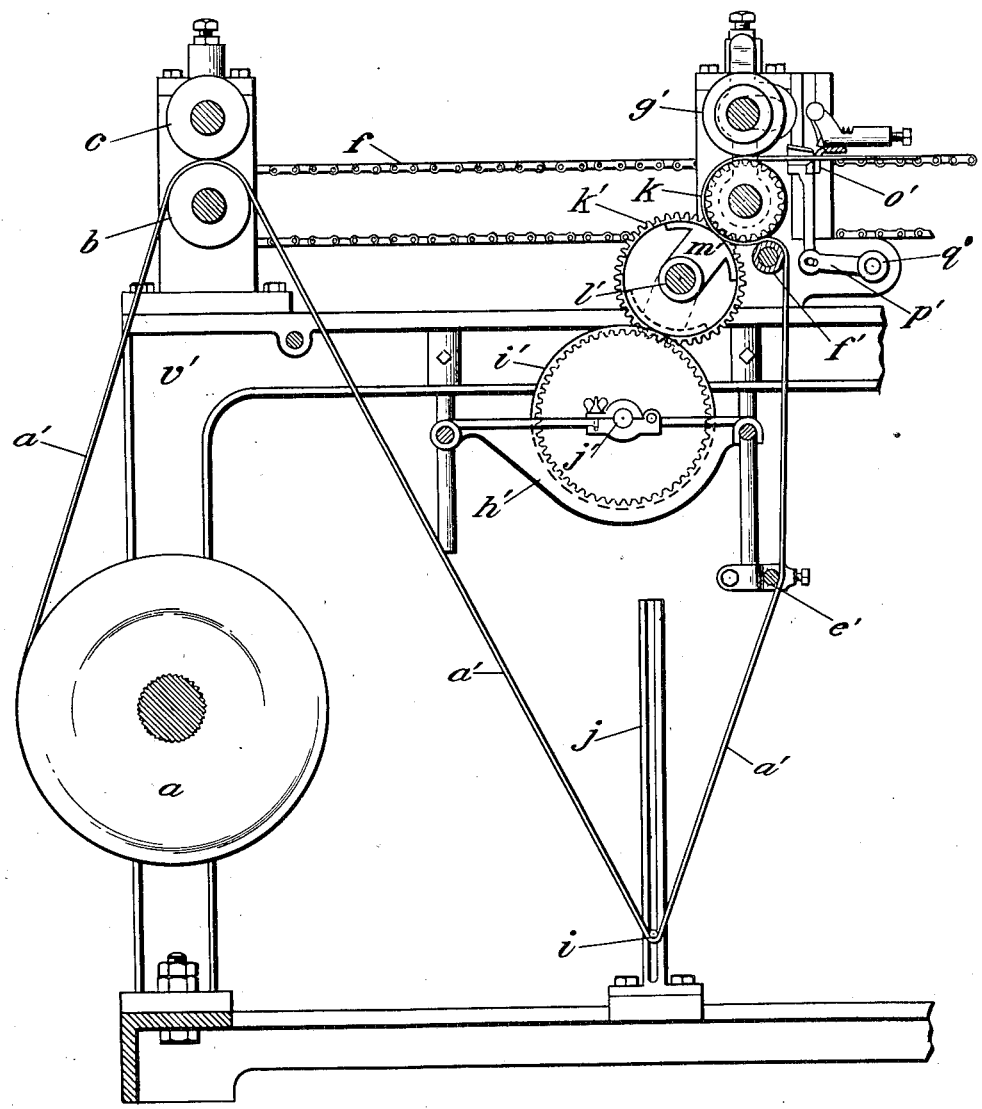
Figure 22:
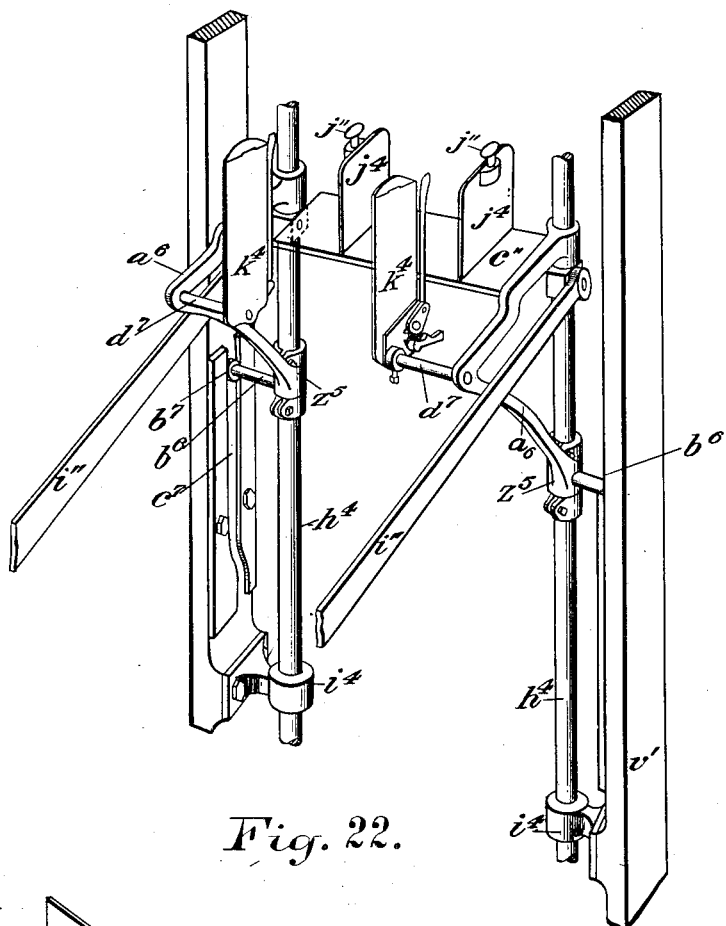
Figure 23:
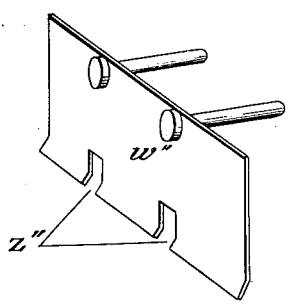
Figure 24:
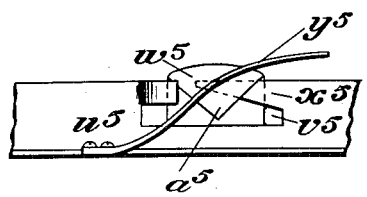
Figure 28:
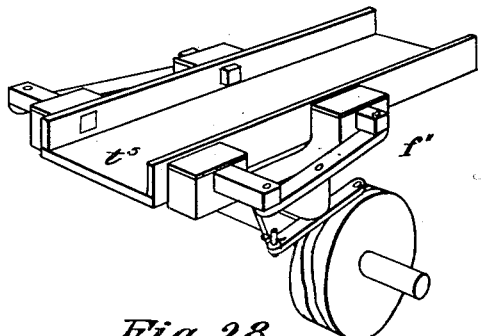
Figure 25:
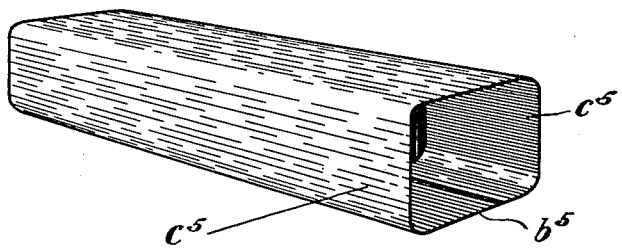
Figure 26:
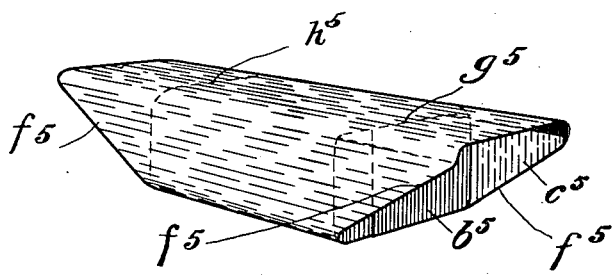
Figure 27:
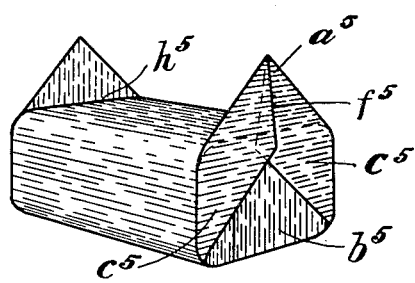

Figure 1, is a side elevation of a wrapping machine constructed according to our principle; Fig. 2, is a plan view of the same; Fig. 3, is a broken section showing the parts of the folding mechanism in normal position; Fig. 4, is a similar view to Fig. 3, with the parts in their folding position; Fig. 5, is a sectional detail showing the paper severing mechanism and the feeding carriage the parts in this view being in their normal position; Fig. 6, is a view of the same construction shown in Fig. 5 with the parts in their actuated positions; Fig. 7, is a sectional detail showing the feeding carriage receding to the position where it receives the loaves from the carrier, the wrapper being shown in this view as formed around three sides of the package; Fig. 8, is a similar view to Fig. 7 with the feeding carriage omitted and the package moved to the position where the end folds are made, the wrapper being shown in this view folded across the fourth side; Fig. 9, shows the end folders in position preparatory to completing the formation of the end folds; Fig. 10, is a similar view to Fig. 9, with the formation of the end folds completed; Fig. 11, shows the means for pressing the gummed edges together and creasing the folds so that they can be turned to lie against the ends of the package; Fig. 12, is a plan view showing part of the drive for the intermittent paper feed; Fig. 13, is a broken side elevation, of the gear and clutch for the intermittent paper feed shown in Fig. 12, when the parts have just declutched; Fig. 14, is a vertical section on the line $x$—$x$ Fig. 13; Fig. 15, is a side elevation of the same parts shown in Fig. 13, with the clutch reëngaged; Fig. 16, is a detail of part of the clutch shown in Figs. 13, 14 and 15, with the clutch parts in the position shown in Fig. 15; Fig. 17, is a detail of the cam and levers controlling the transfer carriage; Fig. 18, is a vertical section of the line $y$—$y$ Fig. 17; Fig. 19, is a plan view of the mechanism for pressing the gummed edges of the end folds together; Fig. 20, is a plan view of the transfer carriage; Fig. 21, is a sectional view of the paper feeding and gumming mechanism; Fig. 22, is a detail view showing the means for imparting lateral movement to the end folders during their lengthwise movement; Fig. 23, is a perspective view of one of the side supports for the loaf when advanced by the feeding carriage for delivery to the loaf supporting table; Fig. 24, is a side elevation of the means for holding the end folds against the ends of the package as the loaf is being pushed to the delivery position; Fig. 25, is a perspective view of a loaf and its partly folded wrapper before the end folds are made; Fig. 26, is a similar view to Fig. 25 showing the first infolds of the wrapper ends; Fig. 27, shows the completion of the end folds prior to the peaks being bent down against the ends of the wrapper; and, Fig. 28, is a detail view of the escapement for intermittently delivering the loaves to the feeding carriage.

While, for the purpose of explaining the principle of our apparatus, its constructive details and mode of operation, we have in the following specification and accompanying drawings, described and shown a machine suitable for bread-wrapping purposes, this being one of the essential uses and objects of our invention, we wish it to be understood that a machine comprising essentially the same combination of parts can be used for the wrapping of other articles, and that in the case of articles of relatively small size, it may be necessary to increase the number of folding units and the timing of their operation, to obtain a satisfactory output.

In the wrapping of bread, it has heretofore been customary to use waxed paper delivered through the folding mechanism to the place where the final folds are sealed by the adhesive qualities of the wax when heated and pressed against the package ends. We might state that in this class of paper, it has also been customary to wax the entire surface from edge to edge, and that owing to the repellent nature of the wax, it has been impossible to gum any part of the surface thereof, and that during a series of exhaustive experiments with the use of this material, we concluded to have waxed paper specially made, leaving an unwaxed margin along each lengthwise edge which could be gummed as the paper passes from the paper roll to the wrapping mechanism. Experience, however, proved several facts adverse to the use of this class of material for wrapping purposes: (a) The cost of waxed paper, at prevailing prices, is at least four times that of unwaxed paper, and this increased cost is a material factor governing the wrapping of the articles; (b) The moisture retaining properties of waxed paper for bread-wrapping purposes where the bread is for immediate consumption or for consumption within a short period after baking, is relatively no greater than that of well calendered unwaxed paper; and (c) Unless a specially made waxed paper with unwaxed margins is used, its non-absorbent and liquid repellent character, renders it a practical impossibility to gum it for fold sealing purposes, and that it is necessary to depend upon the adhesive qualities of the wax for the sealing thereof, which has not been satisfactory, as proper adhesion is dependent on thermostatic conditions. To overcome these and other objections to the use of waxed paper, we have so designed our machine that we can use an unwaxed paper and gum it as we feed it from the paper roll $a$ to the paper severing mechanism hereinafter described. We have also found it impractical to unwind the paper from the paper roll $a$ by an intermittent feed, as the alternate stopping and starting of the feed rolls and the varied tension of the paper, tend to tear it when the feed motion starts. To obviate this trouble, we have provided the machine with a suitable drive to continuously unwind the paper from the paper roll, this drive consisting of two feed rolls $b$ and $c$, between which the paper $a'$ passes from the paper roll $a$. One of these feed rolls $b$ is provided with a sprocket wheel $d$, around which travels a continuous sprocket chain $f$ driven by a sprocket wheel $g$ on the cam shaft $h$. The revolution of the cam shaft $h$ is continuous, and consequently a continuous revolution of the feed roll $b$ is effected through the continuity of the revolution of the sprocket wheel $g$ and the travel of the sprocket chain $f$. This continuous revolution of the feed roll $b$ is transmitted to the feed roll $c$ by means of a suitable gearing $e$, and the feed rolls $b$ and $c$ during their revolution, draw the paper forward from the paper roll, the paper passing from the feed rolls under a tension bar $i$ to the gumming mechanism hereinafter described. The tension bar $i$ is movable in slotted standards $j$ rising to the top of the standards as the paper is carried forward by the intermittent feeding mechanism, hereinafter described, and descending to the bottom of the standards to stretch out the slack in the paper, created by the continuously rotating feed rolls when the action of the intermittent feeding mechanism ceases. This intermittent feeding mechanism consists of a feed roll $k$ provided with a sprocket wheel $l$, a stud $m$ provided with a sprocket wheel $o$, a sprocket chain $p$ passing around said sprocket wheels $l$ and $o$, and a suitable gearing for driving the same, intermittently driven from the cam shaft $h$. This gearing may be described as consisting of a pinion $q$ united revoluble with the sprocket wheel $o$, and meshing with the intermittently revoluble spur wheel $r$ loosely mounted upon the hub $s$ of the spur wheel $t$. The perimeter of the hub is a true circle, but the bore of the spur wheel $r$ has two eccentric recesses $u$, $u'$ to permit of the oscillating movement of the driving dog $v$ as it is pressed into and out of engagement with the driving shoulders $w$, $w'$. These driving shoulders $w$, $w'$ are formed at the forward end of the eccentric recesses $u$, $u'$ respectively and the driving dog $v$ is pivoted within the hub $s$ so that, at the proper time it will be pressed by the spring $x$ into engagement with the operative driving shoulder.

The spur wheel $t$ meshes with the driving pinion $y$ on the driving shaft $z$ and is continuously revolved thereby. The hub $s$ is an integral part of the spur wheel $t$, and the driving dog $r$ being pivoted in the hub and being carried thereby, as a consequence, continuously revolves with said spur wheel. Fixed to the standard $v'$ is a roller $c'$ so positioned that when the spur wheel $t$ has completed its revolution it will engage a trip dog $d'$ connected with the driving dog $r$, and, by bearing against the trip dog, disengage the driving dog from the then operative driving shoulder, and when the driving dog is so disengaged, the spur wheel $t$ makes a further half-revolution to bring the driving dog $v$ into operative relation with the next operative driving shoulder. In this way, the driving dog $v$, during the revolution of the spur wheel $t$, will carry the spur wheel $r$ with it for one-half a revolution, then the driving dog will be disengaged from the operative driving shoulder, and the spur wheel $t$ will complete the other half of its revolution and bring the driving dog $v$ into engagement with the other driving shoulder, which, when so engaged, will move the spur wheel $r$, the remaining half revolution to complete its cycle of motion, when the driving dog $v$ will again be disengaged from the then operative driving shoulder. This action may be summarized by stating that it is possible to obtain an intermittent motion of the spur wheel $r$ during the continuous motion of the spur wheel $t$, and in the example illustrated in Figs. 13, 14, 15 and 16, it is possible to drive the spur wheel $r$ one half a revolution, and to permit it to remain idle for the remaining half revolution, of the spur wheel $t$.

To prevent the overrun of the spur wheel $r$ when its semi-revolution is completed, and thus correctly determine the length of the wrapper, we provide a spring-tensioned dog $r^9$ pivoted on the stud $s^9$ projecting from the main frame $v'$, and we so arrange the point of the dog that it will come into position with a shoulder $t^9$ on the spur wheel $r$, the spur wheel $r$ being provided with two of these shoulders $t^9$ at diametrically opposite points, so that each shoulder will come into position with the dog $r^9$ when it has completed a semi-revolution. To lift the dog into an inoperative position so that the shoulder $t^9$ can clear it when the spur wheel $r$ again starts its rotation, we provide the dog $r^9$ with a roller $u^9$ engaging a cam $v^9$ on the spur wheel $t$. The cam $v^9$ has two raised surfaces which as the spur wheel $t$ rotates, successively engage the roller $u^9$ and tilt the dog at the commencement of each semi-revolution of the spur wheel $r$ into the raised position shown in Fig. 15.

When the spur wheel $r$ is driving, it rotates the pinion $q$ and sprocket wheel $o$, and causes the travel of the sprocket chain $p$ and the rotation of the sprocket wheel $l$ and feed roll $k$, which intermittently feeds the paper, the intermittent feed being taken from the slack resulting from the continuous feed previously described.

When the intermittent feed starts up, the tension placed on the paper raises the tension bar $i$ to the top of the slotted standards $j$, and then, when the intermittent feed stops the tension bar descends to the bottom of the slotted standard, and tensions the slack resulting from the continuous feed.

The path of the paper may be traced as follows:—From the paper roll $a$, the paper passes between the feed rolls $b$ and $c$, under the tension bar $i$, at the side of the guide roll $e'$, over the guide roll $f'$ and then under, at the side of, and over the intermittent feed roll $k$. Opposed to the intermittent feed roll, is a tensioned presser roll $g'$ which bears upon the paper as it passes over the top of the intermittent feed roll $k$ and keeps the paper tightly in contact with that part of the intermittent feed roll $k$ which it is at the time engaging, so that the paste or gum can be evenly distributed to the gummed parts of the surface by the gumming mechanism. This gumming mechanism, as shown in Figs. 2 and 21, consists of two paste dishes $h'$ supported at suitable positions below the path of the paper, and revoluble in the paste dishes $h'$ are the paste rolls $i'$. The paste rolls $i'$ are mounted on the shaft $j'$ journaled in the paste dishes, and driven from the intermittent feed roll $k$ by a suitable gearing $k'$. This gearing $k'$ also drives a shaft $l'$, upon which are fixed the gummers $m'$. These gummers $m'$ may be metal segments or they may be continuous disks, and during the intermittent feed of the paper they take the paste from the paste rolls $i'$ and apply it to the surface of the paper to be gummed.

The gummers $m'$ receive the paste from the paste rolls $i'$, and transfer it to the paper as it passes over the feed roll $k$, during the revolution of the shaft $l'$, and these gummers when of a segmental character, as shown in Fig. 2 are of sufficient segmental length to gum only that part of the fold which is required to be sealed and thus economize the use of the paste and prevent trouble arising through the adhesion of the folds where it would be a disadvantage to apply the paste.

From the feed rolls $k$ and $g'$, the paper passes between the blades of the shears $o'$ operated by a suitable link and crank connection $p'$ from a rock shaft $q'$. The rock shaft $q'$ is oscillated by a crank, link and lever connection $r'$ from a cam $s'$ on the cam shaft $h$, and this motion is so timed that the paper starts to feed across the path of the feeding carriage as the latter recedes to its normal position and the feed of the paper ends when the feeding carriage again starts on its upward course as hereinafter described, the cam $s'$ then operating by means of the crank, link and lever connection $r'$ and crank and link connection $p'$ to operate the shears to sever the paper.

The paper after feeding between the blades of the shears $o'$, passes across the paper supports $d''$, $e''$, which hold it above the top of the loaf being delivered to the feeding carriage. This brings the paper into position to be engaged by the top of the loaf as the feeding carriage ascends.

We have now described the paper feeding, gumming, and severing mechanisms, but before closing this part of our description, it might be stated that a convenient means for holding the paper roll is that shown in Fig. 2 of the drawings, consisting of the corrugated cones $t'$ having their mandrels $y'$, journaled on the frame $v'$ and controlled by a friction clamp $x'$.

Before the bread can be wrapped, it is necessary to convey the loaves from the ovens or cooling room to the wrapping machine, and for this purpose we use a continuous conveyer $a''$, which may be of any ordinary type, and preferably drive it from the pulley $b''$ on the driving shaft $z$. The loaves are delivered from the ovens or cooling room to the belt of the conveyer $a''$ and are carried forward by the conveyer belt to a position contiguous to the feeding carriage $c''$ where they are arrested by an escapement $f''$ intermittently actuated by a gear $g^4$ from the driving shaft $z$, the escapement and the driving gear being so timed that only one loaf will be delivered to the feeding carriage when at its normal position at each complete cycle of action of the machine.

The loaves move in the direction indicated by arrow in Fig. 4, and are carried forward by the conveyer belt toward the feeding carriage, and would, if no provision was made to arrest their movement, crowd the foremost loaf into the path of the feeding carriage before the proper time. To prevent the loaves being crowded into the path of the feeding carriage, we have provided an escapement $f''$ to arrest the foremost loaf, and consequently all pressing against it, until the proper time for the delivery of the feeding carriage, and when the delivery of the foremost loaf to the feeding carriage is effected, the next loaf moves forward to the position occupied by the preceding one for delivery to the feeding carriage on the next cycle of action.

The feeding carriage $c''$ is supported by two guide rods $h^4$ vertically movable through the guide collars $i^4$, secured to the main frame $v'$ (see Figs. 3 and 22), as the feeding carriage travels from its normal position to the initial folders and returns again to its normal position.

At the sides of the feeding carriage $c''$ are upright plates $j^4$, to maintain the loaf in a fixed position on the feeding carriage, this position being in direct relation with the wrapper lying on the paper supports $d''$, $e''$. Opposed to the feeding carriage $c''$ on the opposite side of it to the conveyer, is a stopping plate $g''$ which ends the travel of the loaf from the conveyer, the stopping plate $g''$ being shown in Fig. 3 as forming part of the paper support $d''$.

By the use of the stopping plate $g''$ and the upright plates $j^4$, the loaf can be correctly centered with regard to the wrapper on the paper supports $d''$, $e''$, which owing to its fixed path, controlled by the feed rolls hereinbefore described, must necessarily be correctly delivered to the paper supports at each operation of the paper feeding mechanism.

The feeding carriage, in its normal position as shown in Fig. 3, is below the level of the paper supports $d''$, $e''$, and in this position it receives the loaves from the conveyer. When the conveyer has delivered a loaf to the feeding carriage $c''$, the cam $h''$ revolves, and by means of a bell crank $i''$, raises the feeding carriage toward the initial folders, hereinafter described.

The feeding carriage and the loaf supported thereon, then rise in the direction indicated by arrow in Figs. 3 and 5, and as the carriage rises, the lower paper grips $j'''$, (see Fig. 7), come into contact with the underside of the wrapper and carry it upward until they meet the upper paper grips $k''$ slidably contained in guides $l''$ conveniently supported from the main frame $v'$ (see Fig. 6). These paper grips then holding the wrapper in its fixed relation to the loaf as they continue their journey upward to the initial folders. As shown in Fig. 6, the lower paper grips extend slightly above the top of the loaf, and consequently elevate the underside of the wrapper slightly above it during the upward course of the feeding carriage.

When the feeding carriage has attained its limit of motion and the lower paper grips have pushed the upper paper grips into the position shown in Fig. 7, which is their usual limit of motion, dogs $m''$ mounted on a rock shaft $u^8$ journaled in an arm $o''$ suitably supported from the main frame $v'$, drop into notches $p''$ in the upper grip rods $q''$, and hold the upper paper grips in their elevated position. The feeding carriage then recedes to its normal position, and as the top of the lower paper grip $j''$ descends below the top of the loaf, the underside of the wrapper comes into contact with the loaf, as shown in Fig. 7. This leaves a slight clearance between the wrapper and the underside of the upper paper grips for the lateral movement of the loaf when being carried, by the transfer carriage hereinbefore described, to a position slightly above the loaf supporting table.

The movement of the feeding carriage from its normal position, see Fig. 4, to the delivery of the loaf above the initial folders, see Fig. 7, and the return again of the feeding carriage to its normal position, takes place during the revolution of the cam $h''$. To relieve the cam of part of its effort in raising the feeding carriage from its normal position, we have extended the long arm of the bell crank lever beyond its fulcrum $s''$, and have provided it with a counterbalance $t''$ of sufficient weight to equalize the weight of the carriage, its load and its related parts.

During the ascending movement of the feeding carriage the loaf is pushed past the initial folders $u''$, $v''$, which then engage the wrapper and press it against the two vertical sides and stretch it tightly across the top.

The initial folder $u''$ and a set of adjustable fingers $y''$ are unitedly movable with the transfer carriage $x''$, the initial folder $u''$ in its normal position, see Fig. 6, being slightly clear of the path of the loaf but close enough to the path to engage the wrapper as the loaf moves past it and press the wrapper against the adjacent sides of the loaf.

The folder $v''$ is spring-tensioned and is hinged to the loaf supporting table $r''$ to slightly overhang the path of the loaf as it ascends, so that it will bear against the adjacent side of the loaf and press the wrapper to it, and then press the loaf against the back support $w''$ for the purpose of holding the loaf in a suspended position when the feeding carriage recedes.

As the feeding carriage recedes from the limit of its upward movement, the initial folder $u''$, starts its lateral movement across the feeding carriage path, and, as shown in Fig. 7, presses the down hang of the wrapper at the adjacent side across the bottom of the loaf, the loaf during this movement of the initial folder $u''$, being held stationary against the back support $w''$ by the other initial folder $v''$.

When the initial folder $u''$ has passed fully across the bottom of the loaf, the adjustable fingers $y''$ move through the registering slots $z''$ in the back support $w''$, see Fig. 23, and engaging the adjacent side of the loaf push it toward the loaf supporting table $r''$. During this movement of the initial folder $u''$, the initial folder $v''$ gives way to allow the movable initial folder to pass it, but in giving way, it maintains a pressure upon the wrapper and the loaf, and spreads the downhang of the adjacent side of the wrapper against the bottom side of the loaf, and at the same time draws the wrapper tightly around the other three sides.

When the loaf is pushed to its limit of movement by the adjustable fingers $y''$, it comes into position with the presser plate $a^3$, as shown in Fig. 3, but before the presser plate $a^3$ descends, to engage the loaf, two lifters $b^3$ operated by a cam $c^3$ raise the partly wrapped loaf above the surface of the initial folder $u''$ and hold it in its elevated position until the said initial folder recedes from beneath it, to prevent the initial folder $u''$ from loosening the wrapper.

When the initial folder $u''$ has receded from beneath the loaf, the lifters $b^3$ return to a normal position, as shown in Fig. 7, and lower the loaf to the loaf supporting table $r''$, the initial folder $u''$ being slotted as shown at $t^8$ in Fig. 20 for the movement of the lifters. The presser plate $a^3$ then descends and bears upon the top of the partly wrapped loaf, and holds the loaf in its wrapper in their set position during the formation of the end folds.

To effect a positive motion of the presser plate $a^3$, we have provided it with a bell crank lever $d^3$ fulcrumed to an arm $e^3$ supported from some convenient part of the main frame $v'$, and we have provided the transfer carriage $x''$ with a cam $f^3$ for operating the bell crank lever $d^3$, the cam $f^3$ having an inclined surface actuating the bell crank lever $d^3$ to raise the presser plate as the transfer carriage moves forward, and to lower it as the transfer carriage recedes to a normal position. During the forward movement of the transfer carriage, the presser plate $a^3$ is lifted entirely clear of the loaf, so that there will be no possibility of the wrapper coming into contact with it. During the receding movement of the transfer carriage the cam $f^3$ operates the bell crank lever $d^3$ and lowers the presser plate against the top of the wrapper with sufficient pressure to hold the loaf firmly against the loaf supporting table, during the formation of the end folds. When the parts are in this position, the wrapper is of a tubular shape conforming to the bottom, top and vertical sides of the loaf and projecting beyond the ends of the loaf sufficiently to form the end folds, as shown in Fig. 25.

The end folders, which move in unison with the feeding carriage, rise as the feeding carriage elevates the next loaf, and these end folders come into contact with the projecting ends of the wrapper and fold them to lie smoothly and evenly against the end of the wrapped package. As these end folders complete, in a single movement, the formation of the end folds, we will, before describing the actuating mechanism, explain how they tuck and fold the ends of the wrapper to the required shape.

Each end folder consists of a substantially rectangular plate $k^4$, to the top of which is hinged a triangular plate $l^4$. The rectangular plate $k^4$ moves in a plane substantially parallel with the end of the loaf, and the triangular plate $l^4$ normally occupies an inclined position with relation to the rectangular plate $k^4$. As the end folders rise with the feeding carriage, the top edge of the rectangular plate $k^4$ comes into contact with the bottom side of the wrapper, and, being of substantially the same width as the loaf, folds the bottom side of the wrapper to lie evenly against the end of the loaf and parallel with the edges thereof as indicated at $b^5$ in Fig. 26 and at the same time that it performs this function, it also tucks in the lower half of the vertical sides of the wrapper, as shown in the same figure at $c^5$.

The rectangular plate $k^4$ rises to the top of the vertical side of the loaf, and when it attains this position, what was previously the projecting end of the bottom side of the wrapper is folded to lie evenly and smoothly against the end of the loaf with the vertical sides of the wrapper of substantially triangular shape and the top of the wrapper substantially flat, and it is when the rectangular plate is in this position that the triangular plate $l^4$ which we will hereafter call the hinged member, is moved into the same vertical plane as the rectangular plate. As the hinged member $l^4$ assumes a vertical position, it presses against the top of the wrapper, and, bending it into a vertical plane, forms it to a triangular shape and draws what was previously the vertical sides of the wrapper tightly across the ends of the loaf, as shown in Fig. 27. When the parts have attained the limit of movement in this position, the end fold is completely shaped with the peak $a^5$ of the fold in a substantially perpendicular position, and the apex of the fold is ready to be turned down against the end of the package and sealed thereto.

The fold-forming action of the end folder may be briefly summarized as follows:—The rectangular plate $k^4$, being one of the fold-forming elements, exteriorly engages one side of the wrapper and folds it smoothly and evenly against the article contained therein, and as it continues its advance to its limit of movement, enters interiorly of the remaining sides of the wrapper to define the lines along which the remainder of the end folds are to be made, and when it has fully entered within the remaining sides of the wrapper, it serves as a former and a support for the wrapper sides during the formation of the folds thereof. The hinged member also enters interiorly of the wrapper sides, and when moved into the same plane as the rectangular plate $k^4$, interiorly engages the remaining wrapper sides, and, by tensioning them, effects the formation of the folds along the line defined by the fold-forming element $k^4$. It is possible to modify the construction of the end folder within the scope of the appended claims without departing from the principle of the invention or the result attained from the use thereof.

Owing to the frangible character of the paper, we find it advisable to construct each of the end folders of the two parts $k^4$ and $l^4$, so that the rectangular plates $k^4$ will prepare the end folds to be completed by the triangular or hinged members, which engage the material at an angle of about thirty degrees from the perpendicular and thus avoid breaking it. These hinged members are then straightened out into the same plane as the rectangular plates by the oscillating members $d^5$, which operate to pass across the outer side faces of the end folders when the latter have attained their limit of motion.

In some classes of wrappers, especially those which are not readily tearable, we may make the triangular plates integral parts of the rectangular plates and in such cases, and when the adjacent edges of the peak of the end folds are not intended to overlap, the oscillating members $d^5$ may be dispensed with.

We will describe in detail the construction and operation of the end folders and oscillating members $d^5$ later on.

When the hinged members $l^4$ have been straightened into the same plane as the rectangular plates $k^4$, creasers $e^5$ are moved transversely across the end folds while the end folders are contained therein, to press the gummed edges $f^5$ together and crease the edges $g^5$, $h^5$. These creasers $e^5$, as shown in Figs. 11 and 19, are provided with tensioned arms $i^5$, and these arms are hinged to levers $j^5$. The levers $j^5$ are fulcrumed on studs $k^5$, held by brackets $l^5$ to part of the main frame $v'$, and these studs $k^5$ are provided with cranks $m^5$ connected by universal links $o^5$ to a rock shaft $p^5$ oscillated by a roller connection $q^5$ from the cam $r^5$ on the cam shaft $h$. The cam $r^5$ is so timed that when the formation of the end folds is completed, it will operate the rock shaft and its related parts to move the creasers $e^5$ across the face of the end folds and crease the edges $h^5$ and $g^5$ and press the gummed edges $f^5$ tightly together.

In our opening description of the invention, we stated that in the case of calendered paper, the natural spring of the paper, would, unless the edges of the folds were creased, cause the folds to spring apart, and to thus prevent the opening of the sealed ends of the package, we have provided creasing devices which operate to crease the edges of the peak folds as the end folders recede, and which also operate to press the gummed edges of the folds together so that there will be a proper adhesion. For the operation of these creasing devices a bracket $m^4$ is supported from a bridge $o^4$ forming part of the main frame $v'$, said bracket being disposed vertically above the loaf when positioned for the formation of the end folds, and at each side of the bracket $m^4$ is a rack plate $p^4$ meshing with the pinions $q^4$ of the creaser rollers $r^4$. The creaser rollers $r^4$ are journaled in the movable arms $s^4$ provided with stems $t^4$ coupled together by a cross slide $u^4$. The vertical movement of the cross slide $u^4$ is maintained in a fixed path by guides $v^4$ attached to the main frame $v'$. As shown in Fig. 2, the cross slide $u^4$ is provided with two sets of links $w^4$, to which are connected levers $x^4$ fulcrumed on a rock shaft $z^4$ and operated by cams $y^4$ on the cam shaft $h$. As the cams $y^4$ revolve, they, through the medium of the levers $x^4$, raise and lower the cross slide $u^4$, and thus actuate the creaser rollers $r^4$. During their descending movement the creaser rollers $r^4$ press the edges of the peak $a^5$ of the folds against the rack plates $p^4$ and crease the edges of the peaks while doing so, and in addition to the creasing of the edges, they press the gummed edges of the peaks of the folds tightly together.

When the creaser rollers $r^4$ reach the limit of their downward movement, blades $s^5$ carried by them, come into contact with the bases of the peaks, and, being pressed against them, break the spring of the paper and form creases substantially parallel with the top edges of the loaf, along which the peaks are turned down to lie against the edge of the package. When the creasers rise to their inoperative position, the peaks will fall down along the line of the creases formed by the blades $s^5$. This completes the formation of the end folds, and the next loaf delivered by the transfer carriage to the end folders presses the loaf with the folded wrapper into the delivery channel $t^5$. At the sides of the delivery channel $t^5$ are upright plates $u^5$ converging slightly toward the delivery end, and near the entry end of the delivery channel $t^5$ the upright plates $u^5$ are provided with substantially triangular slots $v^5$, see Fig. 24, the upper ends of which are open as shown at $w^5$. This formation of the upright plates $u^5$ provides a horn $x^5$ at each side of the delivery channel for the purpose hereinafter described.

We stated in the foregoing description that the peaks of the end folds have been creased and ready to fall down against the ends of the package. It is in this condition that the packages are pressed into the delivery channel, and as they advance in the channel, they are engaged by the stationary closing fingers $y^5$ which bend the peaks $a^5$ of the folds into the position shown in Fig. 24.

The wrapped loaf moves between the upright plates $u^5$, and when the peaks $a^5$ come into position with the fingers $y^5$, the latter bend the peaks down on the outer side of the upright plates $u^5$, and in order to seal the peaks to the ends of the package, it is necessary to provide the slots $v^5$, so that the peaks can be pressed against the package ends, the apices being gummed on the inner side for that purpose, the horns $x^5$ extending as shown in Fig. 24, beneath the peaks $a^5$, and holding the side folds flat against the ends of the package while the peaks $a^5$ are being pressed against the package ends. To enable the sealed package ends to clear the horns $x^5$ we have provided the slots $w^5$.

Slidably mounted upon guide rods $h^4$ below the feeding carriage $c''$ are guide collars $z^5$ for the bracket arms $a^6$, and extending from one guide collar $z^5$ of each set is a pin $b^6$ having a roller $b^7$ operating in a vertical cam $c^7$, as shown in Fig. 22. Extending inwardly from each set of bracket arms $a^6$ is a stud $d^7$, and fixed on the studs $d^7$ are the rectangular plates $k^4$. The cams $c^7$ are formed at their lower ends to oscillate the bracket arms $a^6$ outwardly as the bracket arms descend, and thus increase the clearance between the end folders and conveyer belt.

The end folders are shown in Fig. 22 to be at the limit of their upward movement for the completion of the end folds and in this position the bracket arms $a^6$ are oscillated toward each other to reduce the clearance between the inner faces of the rectangular plates $k^4$ and press these plates against the ends of the loaf so that the end folds formed by the rectangular plates may be squeezed against the ends of the loaf. When the end folders descend to their normal position the rollers $b^7$ engage with the curved parts of the cam, and are then actuated to oscillate the bracket arms outward and increase the clearance between the rectangular plates and the end folders. The normal position of the end folders is when the rollers $b^7$ are at the lower end of the cams, and in this position, the end folders straddle the conveyer $a''$ with the loaves passing along the conveyer to the feeding carriage. In this position it is necessary to have plenty of clearance between the end folders to permit of the uninterrupted passage of the loaves, and to provide this clearance, we have mounted the bracket arms for the end folders to oscillate on the guide rods $h^4$, and have provided the cams for swinging the bracket arms outwardly to increase the clearance between the end folders when at their normal position. If this expanded position of the end folders was maintained during the formation of the end folds, the length of the wrapper would be greater than that of its contents, and in order to make a package of a length corresponding to that of its contents, it is necessary to bring the end folders into contact with the ends of the loaf and this is accomplished by providing the cams $c^7$ to oscillate the end folders toward each other to diminish the clearance between them to substantially that of the length of the loaf, and enables the end folders to press the end folds of the wrapper against the ends of its contents and make a tightly fitting wrapper when the end folds are completed. The timing of the cams $c^7$ is such that on the withdrawal of the end folders from the ends of the package, the end folders will descend until the hinged members $l^4$ are clear of the folds, so that the hinged members will not, by any possibility, open the folds after their formation.

When the end folders have attained the position shown in Fig. 22, the oscillating members $d^5$ are moved from the position shown in Fig. 9 to that shown in dotted lines in Fig. 10, this movement of the oscillating members $d^5$ being effected as follows: Each oscillating member $d^5$ is provided with a crank $d^8$ fulcrumed to its respective rectangular plate $k^4$, so that it can oscillate from the position shown in Fig. 9 to that shown in dotted lines in Fig. 10, and as it oscillates from the position shown in Fig. 9 to that shown in dotted lines in Fig. 10, it straightens its respective hinged member $l^4$ into the same plane as the rectangular plate $k^4$ and tucks the adjacent side of the peak of the end fold underneath the edge of the opposite fold side. The oscillating member then turns from the position shown in dotted lines in Fig. 10 to its normal position, and during this movement, the creaser rollers $r^4$ pass across the ends of the package and crease the folds. The movement of each oscillating member $d^5$ is effected as follows: Each of the cranks $d^8$ is formed with a segmental gear $e^8$ meshing with the segmental gear $f^8$ on a fulcrumed lever $g^8$. The lever $g^8$ is formed with a shoulder $h^8$, against which engages a trigger $i^8$, fixed on a rock shaft $j^8$, journaled in lugs $k^8$, secured to the main frame $v'$. The rock shaft $j^8$ is provided with a crank $l^8$ having a pin $m^8$ working in a slotted connecting rod $o^8$ actuated by a cam $p^8$ from the cam shaft $h$. During the revolution of the cam $p^8$, it comes into contact with the roller $q^8$ of the connecting rod $o^8$, and, moving the connecting rod $o^8$ in the direction of arrow indicated in Fig. 17, forces the trigger $i^8$ downward into engagement with the lever $g^8$, and the trigger engaging the shoulder $h^8$, forces the lever $g^8$ downward into the position shown in Fig. 10. This causes the segmental gears $e^8$, $f^8$, to rock the oscillating member $d^5$ into the position shown in dotted lines in Fig. 10. When the cam $p^8$ clears the roller $q^8$, a spring $r^8$ returns the connecting rod $o^8$, and by means of it, the rock shaft $j^8$ and trigger $i^8$ to their normal position as shown in Fig. 9, and a spring $s^8$, then restores the lever $g^8$ to its normal position which has the effect of bringing the oscillating member $d^5$ back to the position shown in Fig. 9. As the oscillating members $d^5$ move from the position shown in dotted lines in Fig. 10 to the position shown in Fig. 9, the creaser rollers $e^5$ start their movement across the ends of the wrapper and crease the end folds as previously described.

We have described how the upper paper grips $k''$ are raised into the position shown in Fig. 7 where they are held in their elevated position by the dogs $m''$ engaging in the notches $p''$ in the rods $q''$ of the upper paper grips, the dogs $m''$ being fixed on a rock shaft $u^8$ journaled in the arms $o''$, and provided with a lever $v^8$. We have also stated that the transfer carriage $x''$ moves to deliver the partially-wrapped loaf from the initial folders to the end folders, and we will now describe the means by which the transfer carriage is actuated, reference being had in this description to the mechanism shown in Fig. 17. On the cam shaft $h$ is a cam $w^8$ engaging a roller $x^8$ journaled on the lever $y^8$ fulcrumed at $z^8$ to a suitable part of the main frame $v'$, and this cam $w^8$, as it revolves rocks the lever $y^8$ between the positions shown in full and dotted lines in Fig. 17. Fulcrumed to the main frame $v'$ is a lever $a^9$ having a link connection $b^9$ with the lever $y^8$. To vary the movement of the lever $a^9$, we have formed in it a slot $c^9$ and provided the link $b^9$ with a suitable adjustment therein. When the link $b^9$ is connected to the lever $a^9$ at the upper end of the slot, we obtain the maximum movement of the lever $a^9$, and when at the lower end, the minimum of movement. The transfer carriage $x''$ is connected to the lever $a^9$ by a link $d^9$ which moves the transfer carriage from its initial position to its transfer position and returns it again to its initial position, the transfer carriage moving on the slideways $e^9$ connected by the brackets $f^9$ to the main frame $v'$, as shown in Fig. 18.

As shown in Fig. 7, when the upper paper grips $k''$ are pressed to their limit of motion, the dogs $m''$ engage in the notches $p''$ and hold them in their elevated position until the pin $g^9$ comes into contact with the lever $v^8$ during the forward movement of the transfer carriage and rocks the dogs out of the notches $p''$ to release the upper paper grips $k''$ for a return to their normal position.

To control the descent of the upper paper grips, we have fixed on each of the rods $q''$ a lug $h^9$, to which is pivotally connected a link $i^9$. These links $i^9$ are also pivotally connected to levers $j^9$ fixed on the rock shaft $k^9$, and the rock shaft $k^9$ is provided with a lever $l^9$ having at its lower end a roller $m^9$. As shown in Fig. 7, there is a slight clearance between the top of the transfer table $x''$ and the roller $m^9$, this clearance occurring when the dogs $m''$ are engaged in the notches $p''$. The purpose of this construction is to enable the dogs $m''$ to hold the paper grips $k''$ in their upper most position until the fingers $y''$ have pushed the partially wrapped loaf from the initial folders. When the partially wrapped loaf has been delivered to a position beneath the presser plate $a^3$, the pin $g^9$ engages the lever $v^8$, and rocking the shaft $u^8$, disengages the dogs $m''$ from the notches. When this occurs, the parts are in the position shown in Fig. 8, and the end of the transfer table is below the roller $m^9$. The paper grips $k''$ and rods $q''$ then descend until the rollers come into contact with the top of the transfer table $x''$, the transfer table temporarily arresting the further movement of the paper grips and rods.

During the receding movement of the transfer table, the paper grips and their rods $q''$ remain in the position shown in Fig. 8 until the recessed part of the transfer table indicated at $o^9$ comes into position with the roller $m^9$. The roller $m^9$ then passes over the corner indicated at $p^9$ and descends along the front edge of the recessed part $o^9$ and permits the paper grips to lower into the position shown in Figs. 5 and 6 without noise or jar.

We have in our present specification, shown and described the gumming of the wrapper edges and the sealing of the folds by the pressing of the gummed edges together, which we have found eminently satisfactory, but we have not fully decided to adopt this method of sealing to the exclusion of all others, as we have also found that the folds when formed as described may be sealed by gummed labels or stickers, applied by suitable mechanism as the package passes through the machine, and this machine we intend to make the subject matter of a further application.

We have, in the foregoing description, described the wrapping of bread, and we have used the word "loaf" as a term to not only describe this particular class of goods, but to include in its meaning, all kinds of merchandise, either of a loose or solid character.

Having thus fully described our invention what we claim as new and desire to secure by Letters Patent is,

1. In a wrapping machine, means for forming the wrapper to a tubular shape around the article, an end folder, and actuating means therefor whereby the end folder will exteriorly engage the tubular wrapper and fold one side and then enter interiorly of it for the formation of the remaining folds.

2. In a wrapping machine, means for forming the wrapper to a tubular shape around the article, an end folder comprising two folder elements, and actuating means therefor whereby one of said folder elements will exteriorly engage and fold one side of the tubular wrapper and then enter interiorly of it to define the lines along which the remaining sides are to be folded and the other of said folder elements will interiorly engage the wrapper for the formation of the remaining folds.

3. In a wrapping machine, side folders, means for delivering an article with its wrapper thereto, means actuating the side folders to bring two opposed sides of the wrapper together and thus form it to a tubular shape, an end folder, and actuating means therefor whereby the end folder will exteriorly engage the tubular wrapper and fold one side of it and then interiorly engage it for the formation of the remaining folds.

4. In a wrapping machine, side folders, means for delivering an article thereto, means for interposing a wrapper across the path of said article to be delivered therewith to the side folders, means actuating the side folders to bring two opposed sides of the wrapper together and thus form the wrapper to a tubular shape around the article, an end folder, and actuating means therefor whereby the end folder will exteriorly engage the tubular wrapper and fold one side of it and then interiorly engage it for the formation of the remaining folds.

5. In a wrapping machine, side folders, means for delivering an article thereto, in termittently-acting means for interposing a wrapper across the path of said article to be delivered therewith to the side folders, means actuating the side folders to bring two opposed sides of the wrapper together and thus form the wrapper to a tubular shape around the article, an end folder, and actuating means therefor whereby the end folder will exteriorly engage the tubular wrapper and fold one side of it and then interiorly engage it for the formation of the remaining folds.

6. In a wrapping machine, side folders, wrapper feeding means, means for delivering an article and its wrapper to the side folders, means actuating the side folders to bring two opposed sides of the wrapper together and form the wrapper to a tubular shape around the article, an end folder, actuating means therefor whereby the end folder will exteriorly engage the tubular wrapper and fold one side and then interiorly engage it for the formation of the remaining folds, and means for effecting the sealing of the end folds.

7. In a wrapping machine, means to form the wrapper to a tubular shape around the article, means to exteriorly engage one side of the tubular wrapper and fold it and then enter interiorly of the wrapper to define the lines along which the remaining sides are to be folded and engage it for the formation of said folds, and means to effect the sealing of the end folds.

8. In a wrapping machine, means for forming the wrapper to a tubular shape around the article, means for folding the ends of the tubular-shaped wrapper, said means entering interiorly of the wrapper sides and drawing the end folds to projecting peaks, and means for turning the peak folds against the package ends whereby they can be sealed.

9. In a wrapping machine, means for forming the wrapper to a tubular shape around the article, means for folding the ends of the tubular shaped wrapper, said means entering interiorly of the wrapper sides and drawing the end folds to projecting peaks, means for turning the peak folds against the package ends, and means for defining the lines along which the peak folds are turned.

10. In a wrapping machine, means for forming the wrapper to a tubular shape around the article, means for holding the ends of the tubular shaped wrapper, said means entering interiorly of the wrapper sides and drawing the end folds to projecting peaks, means for turning the peak folds against the package ends, means for defining the lines along which the peak folds are turned, and means for effecting the sealing of the end folds.

11. In a wrapping machine, means for forming the wrapper to a tubular shape around the article, means for folding the ends of the tubular-shaped wrapper, said means entering interiorly of the wrapper sides and drawing the end folds to projecting peaks, means for turning the peak folds against the package ends whereby they can be sealed, and means for effecting the sealing of the end folds.

12. In a wrapping machine, side folders, means for delivering an article thereto, means for feeding a wrapper across the path of the article to be delivered therewith to the side folders, means actuating the side folders to form the wrapper to a tubular shape around the article, end folders, and actuating means therefor whereby the end folders will exteriorly engage and fold the ends of one side of the tubular wrapper and then interiorly engage and fold the ends of the remaining sides.

13. In a wrapping machine, side folders, means for delivering an article with its wrapper thereto, means actuating the side folders to bring two opposed sides of the wrapper together and thus form it to a tubular shape, end folders, and actuating means therefor whereby the end folders will exteriorly engage and fold the ends of one side of the tubular-shaped wrapper and then interiorly engage and fold the ends of the remaining sides.

14. In a wrapping machine, side folders, means for delivering an article thereto, means for interposing a wrapper across the path of said article to be delivered therewith to the side folders, means actuating the side folders to bring two opposed sides of the wrapper together and thus form the wrapper to a tubular shape around the article, an end folder, actuating means therefor whereby the end folder will exteriorly engage the tubular wrapper and fold one side of it and then interiorly engage it for the formation of the remaining folds, and means for sealing the end folds together.

15. In a wrapping machine, side folders, means for delivering an article with its wrapper thereto, means actuating the side folders to bring two opposed sides of the wrapper together and thus form it to a tubular shape, an end folder, and actuating means therefor whereby the end folder will exteriorly engage the tubular-shaped wrapper and fold one side of it and then interiorly engage it for the formation of the remaining folds, and means to effect the sealing of the end folds.

16. In a wrapping machine, side folders, means for delivering an article with its wrapper thereto, means actuating the side folders to bring two opposed sides of the wrapper together and thus form it to a tubular shape around the article, end folders, and actuating means therefor whereby the end folders will enter interiorly of the wrapper sides and fold the ends of the tubular-shaped wrapper and draw the end folds to projecting peaks, means for turning the peak folds against the package ends, and means for effecting the sealing of the end folds.

17. In a wrapping machine, side folders, means for delivering an article with its wrapper thereto, means actuating the side folders to bring two opposed sides of the wrapper together and thus form it to a tubular shape around the article, end folders, and actuating means therefor whereby the end folders will enter interiorly of the wrapper sides and fold the ends of the tubular-shaped wrapper and draw the end folds to projecting peaks, means for turning the peak folds against the package ends, means for defining the lines along which the peak folds are turned, and means for effecting the sealing of the end folds.

18. In a wrapping machine, side folders, means for delivering an article with its wrapper thereto, means for intermittently feeding a wrapper across the path of the article whereby it will conform to three sides of the article in its travel to the side folders, means actuating the side folders to bring two opposed sides of the wrapper together and thus form it to a tubular shape, an end folder, and actuating means therefor whereby the end folder will exteriorly engage the tubular wrapper and fold one side of it and then interiorly engage and tension it for the formation of the remaining folds.

19. In a wrapping machine, side folders, means for delivering an article with its wrapper thereto, means for intermittently feeding a wrapper across the path of the article whereby it will conform to three sides of the article in its travel to the side folders, means for severing the wrapper, means actuating the side folders to bring two opposed sides of the wrapper together and thus form it to a tubular shape, an end folder, and actuating means therefor whereby the end folder will exteriorly engage the tubular wrapper and fold one side of it and then interiorly engage and tension it for the formation of the remaining folds.

20. In a wrapping machine, means for forming the wrapper to a tubular shape around the article, means for entering interiorly of the wrapper sides and forming the end folds of the tubular shaped wrapper with projecting peaks in the same plane as the package ends, and means for turning the peak folds against the package ends.

21. In a wrapping machine, means for forming the wrapper to a tubular shape around the article, means for entering interiorly of the wrapper sides and forming the end folds of the tubular shaped wrapper with projecting peaks in the same plane as the package ends, means for turning the peak folds against the package ends, and means for sealing the end folds together.

22. In a wrapping machine, means for forming the wrapper to a tubular shape around the article, means for entering interiorly of the wrapper sides and forming the end folds of the tubular wrapper with projecting peaks in the same plane as the package ends, means to define the lines along which the peak folds are turned, and means for closing the peak folds against the package ends.

23. In a wrapping machine, means for forming the wrapper to a tubular shape around the article, means for entering interiorly of the wrapper sides and forming the end folds of the tubular wrapper with projecting peaks in the same plane as the package ends, means to define the lines along which the peak folds are turned, means for closing the peak folds against the package ends, and means for sealing the end folds together.

24. In a wrapping machine, means for forming the wrapper to a tubular shape around the article, means for entering interiorly of the wrapper sides and forming the end folds of the tubular wrapper with projecting peaks in the same plane as the package ends, means to define the lines along which the peak folds are turned, means for closing the peak folds against the package ends, and means for pressing the end folds in their closed condition.

25. In a wrapping machine, means for forming the wrapper to a tubular shape around the article, means for entering interiorly of the wrapper sides and forming the end folds of the tubular wrapper with projecting peaks in the same plane as the package ends, means to define the lines along which the peak folds are turned, means for closing the peak folds against the package ends, means for sealing the end folds together and means for pressing the end folds in their sealed condition.

26. In a wrapping machine, means for forming a wrapper to a tubular shape around the article, an end folder comprising fold-forming elements relatively movable with respect to each other, and actuating means therefor changing their normal relations whereby one of said fold-forming elements will exteriorly engage one side of a tubular wrapper and fold it and then enter interiorly of the other sides, and the other of said fold-forming elements will, during such change of relation, interiorly engage the wrapper and tension it for the formation of the remaining folds.

27. In a wrapping machine, means for forming a wrapper to a tubular shape around the article, an end folder comprising fold-forming elements movable with relation to each other, and actuating means therefor whereby the folder will exteriorly engage and fold one side of the tubular wrapper and enter interiorly of it to define the lines along which the remaining sides are to be folded, said fold-forming elements, during the change of their normal relations, interiorly engaging the wrapper and tensioning it for the formation of the remaining folds.

28. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, presser means to engage the partly-wrapped object and hold the wrapper in its set position while the end folds are being formed, two movable end folders, one at each end of the package to engage the ends of the partly-formed wrapper and at a single operation complete the formation of the end folds, and means to turn the end folds against the ends of the wrapper to effect the sealing thereof.

29. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, presser means to engage the partly-wrapped object and hold the wrapper in its set position while the end folds are being formed, two movable end folders, one at each end of the package to engage the ends of the partly-formed wrapper and at a single operation complete the formation of the end folds, operable means to crease the end folds along the adjacent edges of the object, and means to then turn the end folds against the ends of the wrapper to effect the sealing thereof.

30. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, presser means to engage the partly-wrapped object and hold the wrapper in its set position while the end folds are being formed, movable end folders to engage the ends of the partly-formed wrapper and complete the formation of the end folds, means to crease the end folds along the adjacent edges of the object, and means to then turn the end folds against the ends of the wrapper to effect the sealing thereof, said fold-turning means forming part of the fold-creasing means.

31. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders thereby causing the wrapper to cover three sides of the object, means to complete the wrapping of the fourth side of the object, thus preparing the wrapper for the formation of the end folds, presser means to engage the partly-wrapped object and hold the wrapper in its set position while the end folds are being formed, movable end folders to engage the ends of the partly-formed wrapper and complete the formation of the end folds, and means to turn the end folds against the ends of the wrapper to effect the sealing thereof, said end folders being movable with the carriage as it advances and recedes.

32. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders thereby causing the wrapper to cover three sides of the object, means to complete the wrapping of the fourth side of the object, thus preparing the wrapper for the formation of the end folds, guiding means for the carriage, end folders movable on said guiding means and having an oscillating movement therefrom as they advance and recede with said carriage, and means to effect the oscillation of the end folders and to contract them to substantially one dimension of the object as the carriage advances, and to expand them from their contracted position as the carriage recedes.

33. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders thereby causing the wrapper to cover three sides of the object, means to complete the wrapping of the fourth side of the object, thus preparing the wrapper for the formation of the end folds, end folders to engage the ends of the partly-formed wrapper and complete the formation of the end folds, said end folders each consisting of a movable element having a triangular side which engages the wrapper, and by a single movement of the end folder, folds the end of the wrapper along the four edges of the object to lie evenly against, the side thereof.

34. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, end folders to engage the ends of the partly-formed wrapper to complete the formation of the end folds, said end folders consisting of relatively fixed members and hinged members connected thereto, the hinged members normally occupying planes in angular relation to the fixed members as the end folders come into engagement with the wrapper, and means to move the hinged members into the same planes as the fixed members, to complete the formation of the end folds.

35. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, guiding means, oscillating end folders slidable on the guiding means to engage the ends of the partly-formed wrapper to complete the formation of the end folds, means for causing the oscillation of the end folders toward each other as they move to their fold-forming position and to cause them to move away from each other as they recede therefrom, said end folders consisting of relatively fixed members and hinged members connected thereto, the hinged members normally occupying planes in angular relation to the fixed members as the end folders come into engagement with the wrapper, and means to move the hinged members into the same plane as the fixed members to complete the formation of the end folds.

36. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders thereby causing the wrapper to cover three sides of the object, means to complete the wrapping of the fourth side of the object, thus preparing the wrapper for the formation of the end folds, guiding means, oscillating end folders slidable on the guiding means to engage the ends of the partly-formed wrapper to complete the formation of the end folds, means for causing the oscillation of the end folders toward each other as they move to their fold-forming position and to cause them to move away from each other as they recede therefrom, said end folders consisting of relatively fixed members and hinged members connected thereto, the hinged members normally occupying planes in angular relation to the fixed members as the end folders come into engagement with the wrapper, means to move the hinged members into the same planes as the fixed members to complete the formation of the end folds, and means for causing the end folders to advance to and recede from their fold-forming position.

37. In a wrapping machine, the combination of two folders separated from each other a distance substantially equal to one dimension of the object to be wrapped, a carriage, means for delivering a wrapper interjacent said carriage and folders, means actuating said carriage to push the wrapper and object to be wrapped between said folders thereby causing the wrapper to cover three sides of the object, means to complete the wrapping of the fourth side, thus preparing the wrapper for the formation of the end folds, end folders to engage the ends of the partly-formed wrapper and complete the formation of the end folds, said end folders each comprising a movable element and a triangular element hinged thereto, and means to move the triangular element into the same plane as the movable element when the end folder comes into operative relation with the wrapper to form the peak of the fold.

38. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, end folders to engage the ends of the partly-formed wrapper and complete the formation of the end folds, each of said end folders consisting of a movable element and a triangular-shaped element hinged thereto, and means passing across the end folders to move the triangular element into the same plane as the movable element.

39. In a wrapping machine, the combination of two folders separated from each other a distance substantially equal to one dimension of the object to be wrapped, a carriage, means for delivering a wrapper interjacent said carriage and folders, wrapper gripping elements movable with said carriage to engage one side of said wrapper, movable wrapper gripping elements opposed thereto to engage the other side, means actuating the carriage to push the wrapper and object to be wrapped between said folders, thereby causing the wrapper to cover three sides of the object, means to hold the movable wrapper gripping elements in an inoperative position as the carriage recedes from said folders, and means to complete the wrapping of the fourth side of the object, thus preparing the wrapper for the formation of the end folds, said means releasing the movable wrapper gripping elements for a return to their normal position when the parts are restored to a position of rest.

40. In a wrapping machine, the combination of two folders separated from each other a distance substantially equal to one dimension of the object to be wrapped, a carriage, means for delivering a wrapper interjacent said carriage and folders, wrapper gripping elements movable with said carriage to engage one side of said wrapper, movable wrapper gripping elements opposed thereto to engage the other side, means actuating the carriage to push the wrapper and object to be wrapped between said folders, thereby causing the wrapper to cover three sides of the object, means to hold the movable wrapper gripping elements in an inoperative position as the carriage recedes from said folders, means to complete the wrapping of the fourth side of the object, thus preparing the wrapper for the formation of the end folds, said means releasing the movable wrapper gripping elements for a return to their normal position when the parts are restored to a position of rest, and end folders to engage the ends of the partly-formed wrapper to complete the formation of the end folds.

41. In a wrapping machine, the combination of two folders separated from each other a distance substantially equal to one dimension of the object to be wrapped, a carriage, means for delivering a wrapper interjacent said carriage and folders, wrapper gripping elements movable with said carriage to engage one side of said wrapper, movable wrapper gripping elements opposed thereto to engage the other side, means actuating the carriage to push the wrapper and object to be wrapped between said folders, thereby causing the wrapper to cover three sides of the object, means to hold the movable wrapper gripping elements in an inoperative position as the carriage recedes from said folders, means to complete the wrapping of the fourth side of the object, thus preparing the wrapper for the formation of the end folds, said means releasing the movable wrapper gripping elements for a return to their normal position when the parts are restored to a position of rest, end folders to engage the ends of the partly-formed wrapper to complete the formation of the end folds, and means to turn the end folds against the ends of the wrapper to effect the sealing thereof.

42. In a wrapping machine, the combination of two folders separated from each other a distance substantially equal to one dimension of the object to be wrapped, a carriage, means for delivering a wrapper interjacent said carriage and folders, wrapper gripping elements movable with said carriage to engage one side of said wrapper, movable wrapper gripping elements opposed thereto to engage the other side, means actuating the carriage to push the wrapper and object to be wrapped between said folders, thereby causing the wrapper to cover three sides of the object, means to hold the movable wrapper gripping elements in an inoperative position as the carriage recedes from said folders, means to complete the wrapping of the fourth side of the object, thus preparing the wrapper for the formation of the end folds, said means releasing the movable wrapper gripping elements for a return to their normal position when the parts are restored to a position of rest, end folders to engage the ends of the partly-formed wrapper to complete the formation of the end folds, means to turn the end folds against the ends of the wrapper to effect the sealing thereof, and a delivery chute into which the wrapped object is delivered, the sides of said chute being arranged to press the end folds against the ends of the wrapper as the wrapped object passes therethrough.

43. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, and lifting means to raise the partly-wrapped object above the movable folder, and operable means actuating the lifting means before the movable folder recedes.

44. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, lifting means to raise the partly-wrapped object above the movable folder, and operable means actuating the lifting means before the movable folder recedes, and presser means to engage the partly-wrapped object to maintain the wrapper in its fixed position during the formation of the end folds.

45. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, lifting means to raise the partly-wrapped object above the movable folder, and operable means actuating the lifting means before the movable folder recedes, presser means to engage the partly-wrapped object to maintain the wrapper in its fixed position during the formation of the end folds, and end folders to engage the ends of the wrapper and complete the formation of the end folds.

46. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, lifting means to raise the partly-wrapped object above the movable folder, and operable means actuating the lifting means before the movable folder recedes, presser means to engage the partly-wrapped object to maintain the wrapper in its fixed position during the formation of the end folds, end folders to engage the ends of the wrapper and complete the formation of the end folds, and means to turn the end folds against the ends of the wrapper to effect the sealing thereof.

47. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides, means to complete the wrapping of the fourth side of the object, thus preparing the wrapper for the formation of the end folds, end folders to engage the ends of the partly-formed wrapper to complete the formation of the end folds, said end folders consisting of relatively fixed members and hinged members, having convergent sides, connected thereto, the hinged members normally occupying planes in angular relation to the fixed members as the end folders come into engagement with the wrapper, and means to move the hinged members into the same plane as the fixed members to complete the formation of the end folds.

48. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders thereby causing the wrapper to cover three sides of the object, means to complete the wrapping of the fourth side of the object, thus preparing the wrapper for the formation of the end folds, guiding means, oscillating end folders slidable on the guiding means to engage the ends of the partly-formed wrapper to complete the formation of the end folds, means for causing the oscillation of the end folders toward each other as they move to their fold forming position, and to cause them to move away from each other as they recede therefrom, said end folders consisting of relatively fixed members and hinged members connected thereto, said hinged members having convergent sides, and normally occupying planes in angular relation to the fixed members as the end folders come into engagement with the wrapper, and means to move the hinged members into the same plane as the fixed members to complete the formation of the end folds.

49. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between the folders, thereby causing the wrapper to cover three sides of the object, means to complete the wrapping of the fourth side of the object, thus preparing the wrapper for the formation of the end folds, guiding means, oscillating end folders slidable on the guiding means to engage the ends of the partly-formed wrapper to complete the formation of the end folds, means for causing the oscillation of the end folders toward each other as they move to their fold forming position, and to cause them to move away from each other as they recede therefrom, said end folders consisting of relatively fixed members and hinged members connected thereto, said hinged members having convergent sides, the hinged members normally occupying planes in angular relation to the fixed members as the end folders come into engagement with the wrapper, means to move the hinged members into the same planes as the fixed members to complete the formation of the end folds, and means for causing the end folders to advance and recede from their fold forming position.

50. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, end folders to engage the ends of the partly-folded wrapper and complete the formation of the end folds, each of said end folders consisting of a movable element and a triangular-shaped element hinged thereto, and means to move the triangular element into the same plane as the movable element.

51. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, counterbalancing means connected with the carriage to equalize the weight of the carriage and object as the carriage advances, means to complete the wrapping of the fourth side of the object, thus preparing the wrapper for the formation of the end folds, and movable end folders to engage the ends of the partly-formed wrapper and complete the formation of the end folds.

52. In a wrapping machine, the combination of two folders separated from each other a distance substantially equal to one dimension of the object to be wrapped, a carriage, means for delivering a wrapper interjacent said carriage and folders, means for shearing the paper into predetermined lengths, means for gripping the paper movable with the carriage, means actuating the carriage to push the wrapper and object to be wrapped between said folders, thereby causing the wrapper to cover three sides of the object, means to complete the wrapping of the fourth side of the object, thus preparing the wrapper for the formation of the end folds, and movable end folders to engage the ends of the partly-formed wrapper and complete the formation of the end folds.

53. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, movable end folders to engage the ends of the partly-formed wrapper and complete the formation of the end folds, said end folders consisting of relatively fixed elements and hinged elements connected thereto, the hinged elements being angularly disposed to the fixed elements, and means moving across the faces of the end folders to tuck in the edges of the peaks of the end folds.

54. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, movable end folders to engage the ends of the partly-formed wrapper and complete the formation of the end folds, said end folders consisting of relatively fixed elements and hinged elements connected thereto, the hinged elements being angularly disposed to the fixed elements, means moving across the faces of the end folders to tuck in the edges of the peaks of the end folds, and means to move the hinged elements into the same plane as the relatively fixed elements.

55. In a wrapping machine, the combination of two folders separated from each other a distance substantially equal to one dimension of the object to be wrapped, a carriage, means for delivering a wrapper interjacent said carriage and folders, means actuating the carriage to push the wrapper and object to be wrapped between said folders, thereby causing the wrapper to cover three sides of the object, means to complete the wrapping of the fourth side of the object, thus preparing the wrapper for the formation of the end folds, movable end folders to engage the ends of the partly-formed wrapper and complete the formation of the end folds, said end folders consisting of relatively fixed elements and hinged elements connected thereto, the hinged elements being angularly disposed to the fixed elements, means moving across the faces of the end folders to tuck in the edges of the peaks of the end folds, means to move the hinged elements into the same plane as the relatively fixed elements, and means for moving the hinged elements back into angular relations with the relatively fixed elements as they recede from their folding positions.

56. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, a supporting element opposed to the relatively stationary folder and coöperating therewith to hold the partly-wrapped object as the carriage recedes, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, and two end folders one at each end of the package to engage the ends of the wrapper and at a single operation complete the formation of the end folds.

57. In a wrapping machine, the combination of two folders separated from each other a distance substantially equal to one dimension of the object to be wrapped, a carriage, means for delivering a wrapper interjacent said carriage and folders, one of said folders being movable across the path of the carriage and the other relatively stationary, means actuating said carriage to push the wrapper and object to be wrapped between said folders, thereby causing the wrapper to cover three sides of the object, a supporting element opposed to the relatively stationary folder and coöperating therewith to hold the partly-wrapped object as the carriage recedes, means connected with the movable folder to engage the object as the movable folder passes across the path of the carriage, said supporting element being slotted to permit of the movement of the object engaging means, means actuating the movable folder to pass partly across the fourth side of the object and spread the adjacent end of the wrapper against it and to then carry the object and wrapper past the relatively movable folder, which draws the wrapper tightly around the object and spreads its adjacent end below the fourth side of the object, and two end folders one at each end of the package to engage the ends of the wrapper and at a single operation complete the formation of the end folds.

58. In a wrapping machine, the combination of two folders separated from each other a distance substantially equal to one dimension of the object to be wrapped, a carriage, intermittently acting means for delivering a wrapper interjacent said carriage and folders, means movable with said carriage for holding the wrapper above said object as they move to said folders, and means to release the wrapper from said wrapper holding means as the carriage recedes.

59. In a wrapping machine, the combination of two folders separated from each other a distance substantially equal to one dimension of the object to be wrapped, a carriage, intermittently acting means for delivering a wrapper interjacent said carriage and folders, means movable with said carriage for holding the wrapper above said object as they move to said folders, means to release the wrapper from said wrapper holding means as the carriage recedes, and means to restore the wrapper holding means to a normal position when said carriage has been restored to a position of rest.

60. In a wrapping machine, the combination of two folders separated from each other a distance substantially equal to one dimension of the object to be wrapped, a carriage, intermittently acting means for delivering a wrapper interjacent said carriage and folders, means movable with said carriage for holding the wrapper above said object as they move to said folders, and means to release the wrapper from said wrapper holding means as the carriage recedes, one of said folders being yieldingly supported at one side of the path of said carriage and the other of said folders movable across said path, and means coöperating with said yielding folder to support the partially-wrapped object until engaged by the movable folder.

61. In a wrapping machine, wrapper folding means comprising folders for forming four sides of the wrapper, and end folders for forming the other two sides, said end folders each consisting of a movable element having a triangular edge, whereby each end folder in a single operation closes three edges of the wrapper against the object and draws the fourth edge of the wrapper to a peak.

62. In a wrapping machine, wrapper folding means comprising folders for forming four sides of the wrapper, and end folders for forming the other two sides, said end folders each consisting of a movable element and a substantially triangular element hinged to the movable element, whereby each end folder in a single operation closes three edges of the wrapper against the object and draws the fourth edge of the wrapper to a peak.

63. In a wrapping machine, wrapper folding means comprising two end folders each consisting of a movable element and a yielding element angularly disposed thereto, and means for moving the yielding element into the same plane as the movable element, whereby each end folder in a single operation closes three edges of the wrapper against the object and draws the fourth edge of the wrapper to a peak.

64. In a wrapping machine, wrapper folding means comprising two end folders each consisting of a movable element and a hinged element angularly disposed thereto, and means for moving the hinged element into the same plane as the movable element during the fold forming operation, whereby said fold-forming element in a single operation closes three edges of the wrapper against the object and draws the fourth edge of the wrapper to a peak.

65. In a wrapping machine, wrapper folding means comprising a movable element and a fold forming element angularly disposed thereto, and means for bringing the fold forming element into the same plane as the movable element during their fold forming operation whereby said fold-forming element in a single operation closes three edges of the wrapper against the object and draws the fourth edge of the wrapper to a peak.

66. In a wrapping machine, wrapper folding means, a feeding carriage associated therewith and movable to and from the wrapper folding means, wrapper holders movable with the feeding carriage as the feeding carriage travels to the wrapper folding means, means for detaining the wrapper holders in an inoperative position as the feeding carriage recedes to a normal position, and means for releasing the wrapper holders when the cycle of action is completed for their return to their normal position.

67. In a wrapping machine, wrapper folding means, a feeding carriage associated therewith and movable to and from the wrapper folding means, wrapper holders movable with the feeding carriage as the feeding carriage travels to the wrapper folding means, means for detaining the wrapper holders in an inoperative position as the feeding carriage recedes to a normal position, and means for controlling the return of the wrapper holders to a normal position.

68. In a wrapping machine, a feeding carriage, wrapper folding means associated therewith comprising a tensioned folder hinged to normally overhang one side of the path of the feeding carriage, a movable folder opposed to the yielding folder and located on the other side of said path, means for actuating the feeding carriage to move between said folders and return to a normal position, a transfer carriage traveling with the movable folder, wrapper holders movable with the feeding carriage, to the wrapper folding means, means for locking the wrapper holders when the feeding carriage returns to a normal position, and means coöperating with the transfer carriage to control the return of the wrapper holders to a normal position.

69. In a wrapping machine, a movable feeding carriage, two folders located on opposite sides of the path of the feeding carriage for forming the side folds, two end folders one at each end of the package to engage the ends of the wrapper and at a single operation complete the formation of the end folds, means for transferring the package from the feeding carriage to the end folders, means for applying a pressure to the package while the end folds are being made, means for creasing the end folds, and means for closing the end folds against the ends of the package.

70. In a wrapping machine, an end folder consisting of a substantially rectangular element, and a substantially triangular element hinged to the top thereof and normally occupying an inclined position with relation to the plane of the rectangular element whereby the end folder in a single operation closes three edges of the wrapper against the object and draws the fourth edge of the wrapper to a peak.

71. In a wrapping machine, an end folder consisting of a substantially rectangular element, and a substantially triangular element associated with and normally occupying an inclined position with relation to the plane of, the rectangular element, and means for moving the triangular element into the same plane as the rectangular element, whereby the end folder in a single operation closes three edges of the wrapper against the object and draws the fourth edge of the wrapper to a peak.

72. In a wrapping machine, wrapper folding means, a feeding carriage associated therewith and movable to and from the wrapper folding means, wrapper holders movable with the feeding carriage as the feeding carriage travels to the wrapper folding means, means for detaining the wrapper holders in an inoperative position as the feeding carriage recedes to a normal position, means for releasing the wrapper holders when the cycle of action is completed for their return to their normal position, and means for controlling the return of the wrapper holders to a normal position.

73. In a wrapping machine, a feeding carriage, wrapper folding means associated therewith comprising a tensioned folder hinged to normally overhang one side of the path of the feeding carriage, a movable folder opposed to the yielding folder and located on the other side of said path, means for actuating the feeding carriage to move between said folders and return to a normal position, means actuating the movable folder to travel across the path of the feeding carriage as it recedes, a transfer carriage traveling with the movable folder, wrapper holders movable with the feeding carriage, to the wrapper folding means, means for locking the wrapper holders when the feeding carriage returns to a normal position, and means coöperating with the transfer carriage to control the return of the wrapper holders to a normal position.

74. In a wrapping machine, an end folder consisting of a substantially rectangular element, a substantially triangular element hinged to the top thereof and normally occupying an inclined position with relation to the plane of the rectangular element, and means for moving the triangular element into the same plane as the rectangular element whereby the end folder in a single operation closes three edges of the wrapper against the object and draws the fourth edge of the wrapper to a peak.

75. A folder comprising a fold-forming element to exteriorly engage and fold the end of one side of a tubular wrapper and then enter interiorly of its remaining sides to define the lines along which they are to be folded, and means coöperating with the fold-forming element to interiorly engage the remaining wrapper sides and tension them to effect the formation of the folds along the lines so defined.

76. A folder comprising hingedly-connected fold-forming elements relatively movable with respect to each other, whereby one of said fold-forming elements will exteriorly engage and fold one side of a tubular wrapper and then enter interiorly of its remaining sides to define the lines along which they are to be folded, and actuating means for said fold-forming elements, changing their normal relations whereby during such change, the other fold-forming element will interiorly engage the remaining wrapper sides and fold them along the lines so defined.

77. A folder comprising fold-forming elements relatively movable with respect to each other and actuating means therefor changing their normal relations whereby the folder will exteriorly engage and fold one side of a tubular wrapper and then enter interiorly of its remaining sides and define the lines along which they are to be folded, said actuating means when changing the normal relations of the fold-forming elements causing the other fold-forming element to interiorly engage the remaining wrapper sides and fold them along the lines so defined.

78. A folder comprising a fold-forming element to close one side of a wrapper and then enter interiorly of the remaining sides to define the lines of the folds and serve as a former and support therefor, and means coöperating with the fold-forming element to interiorly engage the wrapper and, by tensioning it, effect the formation of the folds along the lines defined by said fold-forming element.

79. A folder comprising oscillatingly-connected fold-forming elements, and actuating means therefor, whereby the folder will exteriorly engage and fold one side of a tubular wrapper and then enter interiorly of its remaining sides to define the lines along which they are to be folded, and then by interiorly engaging said remaining sides fold them along the lines so defined.

80. A folder comprising a relatively fixed member, a movable member hingedly connected and angularly disposed to said relatively fixed member, said members being normally inoperative as the folder comes into engagement with the wrapper, and means to bring the movable member into operative relation with said fixed member whereby said folder will complete the formation of a plural number of folds at a single operation.

81. A folder comprising relatively fixed and movable elements hingedly connected in angular relation to exteriorly engage and fold one side of a tubular wrapper and then enter interiorly of its remaining sides to define the lines along which they are to be folded, and means changing the relation of said fixed and movable elements whereby the folder will engage the remaining wrapper sides and fold them along the lines so defined.

82. A folder comprising fold-forming elements angularly disposed to each other when the folder engages the wrapper, one of said elements having convergent sides, and means for bringing said elements into substantially the same plane, whereby they will, at a single operation, complete the formation of a plural number of folds.

83. A folder comprising hingedly connected fold-forming elements angularly disposed to each other when the folder engages the material, and means for bringing them into substantially the same plane, whereby they will, at a single operation, complete the formation of a plural number of folds.

84. A folder comprising a relatively fixed element, and a fold-forming element angularly disposed thereto when the folder engages the material, and means for bringing the fold-forming element into substantially the same plane as the relatively fixed element whereby the folder will, at a single operation, complete the formation of a plural number of folds.

85. A folder comprising a relatively fixed element having a fold-forming element angularly disposed thereto when the folder engages the material, said fold-forming element having convergent sides, and means for bringing the fold-forming element into substantially the same plane as the relatively fixed element, whereby the folder will, at a single operation, complete the formation of a plural number of folds.

86. A folder comprising a relatively fixed element, and a fold-forming element angularly disposed thereto and normally inoperative when the folder engages the wrapper, and means for rendering the fold-forming element operative, whereby the folder will, at a single operation, complete the formation of a plural number of folds.

87. A folder comprising a relatively fixed element, and a fold-forming element angularly disposed thereto and normally inoperative when the folder engages the wrapper, and means for bringing the fold-forming element into operative relation with the relatively fixed element, whereby the folder will, at a single operation, complete the formation of a plural number of folds, said fold-forming element having convergent sides.

88. A folder consisting of a relatively fixed element, and a fold-forming element hinged thereto and normally occupying an inclined position with relation to the plane of the relatively fixed element, and means for moving the fold-forming element into substantially the same plane as the relatively fixed element, whereby the folder, at a single operation, will complete the formation of a plural number of folds.

89. A folder consisting of a relatively fixed element, and a fold-forming element hinged thereto and normally occupying an inclined position with relation to the plane of the relatively fixed element, said fold-forming element having convergent sides, and means for moving the fold-forming element into substantially the same plane as the relatively fixed element, whereby the folder, at a single operation, will complete the formation of a plural number of folds.

90. A folder comprising two fold-forming elements, and actuating means therefor whereby one of said fold-forming elements will exteriorly engage and fold one side of a tubular wrapper and then enter interiorly of its remaining sides to define the lines along which the folds are to be made, and the other of said elements will interiorly engage the wrapper for the folding of the wrapper sides along the lines so defined.

91. In a wrapping machine, a folder comprising two fold-forming elements, and actuating means therefor whereby one of said fold-forming elements will exteriorly engage and fold one side of a tubular-shaped wrapper and then enter interiorly of its remaining sides to define the lines along which they are to be folded and the other of said elements will interiorly engage the wrapper and tension it for the formation of the remaining folds.

92. A folder comprising a fold-forming element to exteriorly engage and fold one side of a tubular wrapper and then enter interiorly of its remaining sides to define the lines along which they are to be folded, and means to interiorly engage the wrapper for the formation of the folds along the lines so defined.

93. A folder comprising a fold-forming element to exteriorly engage and fold one side of a tubular wrapper and then enter interiorly of its remaining sides to define the lines along which they are to be folded, and means to interiorly engage the remaining wrapper sides and fold them along the lines so defined.

94. A folder comprising a fold-forming element to exteriorly engage and fold the end of one side of a tubular wrapper and then enter interiorly of its remaining sides to define the lines along which they are to be folded, and means to interiorly engage the remaining wrapper sides and tension them to effect the formation of the folds along the lines so defined.

95. A folder comprising hingedly-connected fold-forming elements relatively movable with respect to each other, whereby one of said fold-forming elements will exteriorly engage and fold one side of a tubular wrapper and then enter interiorly of its remaining sides to define the lines along which they are to be folded, and means changing their normal relations whereby during such change, the other fold-forming element will interiorly engage the remaining wrapper sides and fold them along the lines so defined.

96. A folder comprising fold-forming elements relatively movable with respect to each other, and means changing their normal relations, whereby the folder will exteriorly engage and fold one side of a tubular wrapper and then enter interiorly of its remaining sides and define the lines along which they are to be folded, said means when changing the normal relations of the fold-forming elements causing the other fold-forming element to interiorly engage the remaining wrapper sides and fold them along the lines so defined.

97. A folder comprising relatively fixed and movable elements to close one side of a wrapper and then enter interiorly of the remaining sides to define the lines of the folds and serve as a former and support therefor, and means causing the movable element to interiorly engage the wrapper and tension it to effect the formation of the folds along the lines so defined.

98. A folder comprising relatively fixed and movable elements, and actuating means therefor, whereby the folder will exteriorly engage and fold one side of a tubular wrapper and then enter interiorly of its remaining sides to define the lines along which they are to be folded, and then by interiorly engaging it, fold the remaining sides along the lines so defined.

99. A folder comprising a relatively fixed member, a movable member hingedly connected thereto, said members being normally inoperative as the folder comes into engagement with the wrapper, and means to bring the movable member into operative relation with said fixed member whereby said folder will complete the formation of a plural number of folds at a single operation.

100. A folder comprising relatively fixed and movable elements hingedly connected to exteriorly engage and fold one side of a tubular wrapper and then enter interiorly of its remaining sides to define the lines along which they are to be folded, and means changing the relation of said fixed and movable elements whereby the folder will engage the remaining sides and fold them along the lines so defined.

101. A folder comprising fixed and movable elements in contracted relation when the folder engages the wrapper, one of said elements having convergent sides, and means for bringing said fixed and movable elements into expanded relation, whereby they will, at a single operation, complete the formation of a plural number of folds.

102. A folder comprising a relatively fixed element, and a movable element hingedly connected in contracted relation when the folder engages the material, and means for bringing them into expanded relation, whereby they will, at a single operation, complete the formation of a plural number of folds.

103. A folder comprising a relatively fixed element, and a movable element coöperating therewith in contracted relation when the folder engages the material, and means for bringing the movable element into expanded relation with the relatively fixed element whereby the folder will, at a single operation, complete the formation of a plural number of folds.

Toronto, July 20th, 1912.

ARTHUR PEART HOLDEN.
PHILIP MORGAN.

Signed in the presence of—
EDWARD BERNSTEIN,
C. H. RICHES.